(12) United States Patent
Harada et al.

(10) Patent No.: US 10,841,921 B2
(45) Date of Patent: Nov. 17, 2020

(54) RADIO BASE STATION, USER TERMINAL AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP); Yu Jiang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/927,294

(22) Filed: Mar. 21, 2018

(65) Prior Publication Data

US 2018/0220420 A1    Aug. 2, 2018

Related U.S. Application Data

(63) Continuation of application No. PCT/JP2016/077932, filed on Sep. 23, 2016.

(30) Foreign Application Priority Data

Sep. 24, 2015    (JP) .................................. 2015-187509

(51) Int. Cl.
*H04W 72/04* (2009.01)
*H04W 74/08* (2009.01)
*H04W 24/10* (2009.01)
*H04W 16/14* (2009.01)

(52) U.S. Cl.
CPC ....... *H04W 72/0446* (2013.01); *H04W 24/10* (2013.01); *H04W 74/0808* (2013.01); *H04W 16/14* (2013.01)

(58) Field of Classification Search
CPC ......... H04W 72/0446; H04W 74/0808; H04W 24/10; H04W 16/14
See application file for complete search history.

(56) References Cited

U.S. PATENT DOCUMENTS 10,257,856 B2 *  4/2019  Park ....................... H04W 48/10
2017/0048718 A1 *  2/2017  Kim .................. H04W 56/0005

FOREIGN PATENT DOCUMENTS

WO         2015138077 A1    9/2015

OTHER PUBLICATIONS

Extended European Search Report issued in corresponding European Application No. 16848625.6, dated Aug. 28, 2018 (7 pages).
Office Action issued in the counterpart Japanese Patent Application No. 2015-187509, dated Dec. 13, 2016 (15 pages).
Office Action issued in the counterpart Japanese Patent Application No. 2015-187509, dated Apr. 11, 2017 (9 pages).

(Continued)

*Primary Examiner* — Vinncelas Louis
(74) *Attorney, Agent, or Firm* — Osha Bergman Watanabe & Burton LLP

(57) ABSTRACT

A radio base station is disclosed. The radio base station has a transmitter that transmits downlink (DL) data and a measurement signal to a user terminal and a processor that executes control of transmission of the DL data and the measurement signal based on a result of listening, which is performed before signals are transmitted. The processor applies different conditions to listening that is performed before the DL data is transmitted and listening that is performed before the measurement signal is transmitted.

10 Claims, 14 Drawing Sheets

(56) References Cited

OTHER PUBLICATIONS

Office Action issued in the counterpart Japanese Patent Application No. 2017-135278, dated Jul. 31, 2018 (11 pages).
Huawei, HiSilicon; "Description of candidate LBT schemes"; 3GPP TSG RAN WG1 Ad-hoc Meeting R1-150978; Paris, France, Mar. 24-26, 2015 (11 pages).
International Search Report issued in the corresponding International Application No. PCT/JP2016/077932, dated Dec. 13, 2016 (2 pages).
Written Opinion issued in the corresponding International Application No. PCT/JP2016/077932, dated Dec. 5, 2016 (5 pages).
3GPP TS 36.300, V12.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12); Dec. 2014 (251 pages).
Coolpad; "Discussion on DL reference signal transmission for LAA"; 3GPP TSG RAN WG1 Meeting #81, R1-153306; Fukuoka, Japan, May 25-29, 2015 (4 pages).
NTT DOCOMO, Inc.; "Views on DL LBT mechanism and contention window size adaptation"; 3GPP TSG RAN WG1 Meeting #82, R1-154403; Beijing, China, Aug. 24-28, 2015 (7 pages).
Samsung; "DRS design and LBT procedure"; 3GPP TSG RAN WG1 Meeting #82, R1-154767; Beijing, China, Aug. 24-28, 2015 (7 pages).
AT&T; "Drivers, Benefits and Challenges for LTE in Unlicensed Spectrum"; 3GPP TSG-RAN Meeting #62, RP-131701; Busan, Korea, Dec. 3-6, 2013 (3 pages).

* cited by examiner

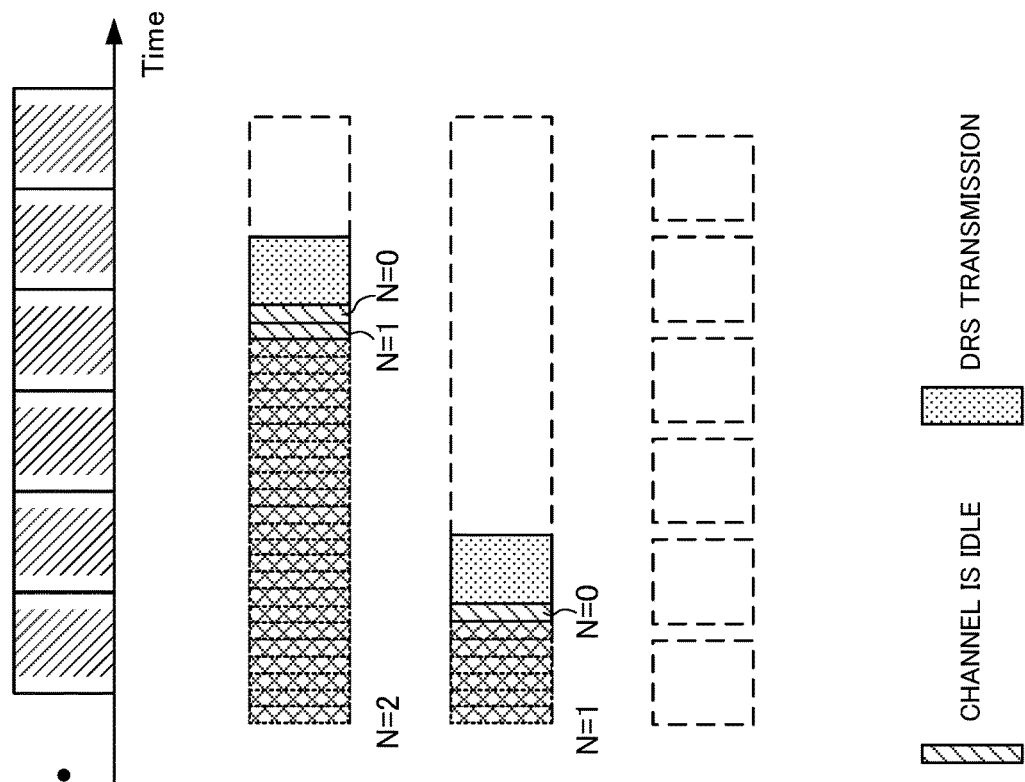
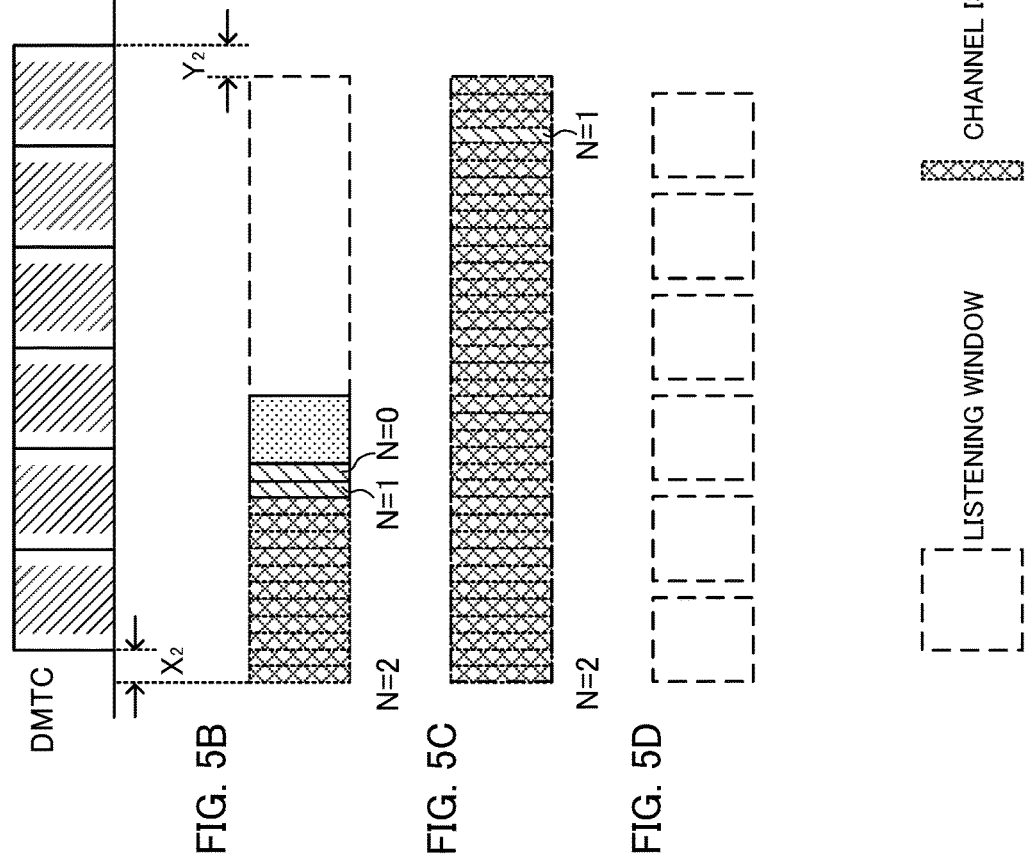
FIG. 5A
FIG. 5B
FIG. 5C
FIG. 5D

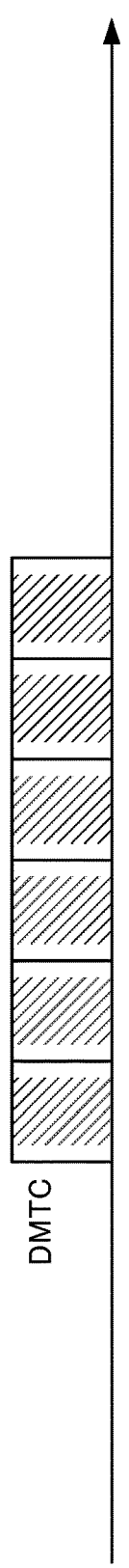
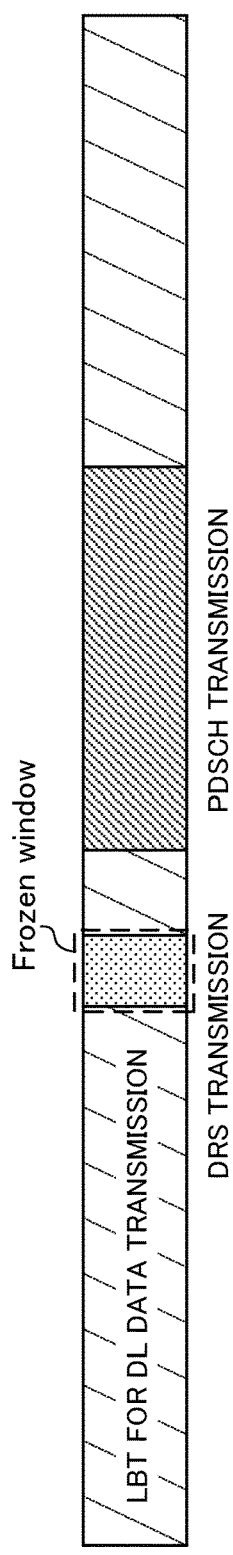
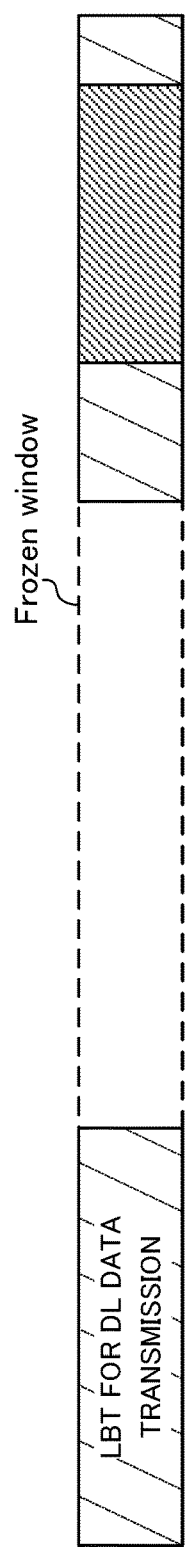
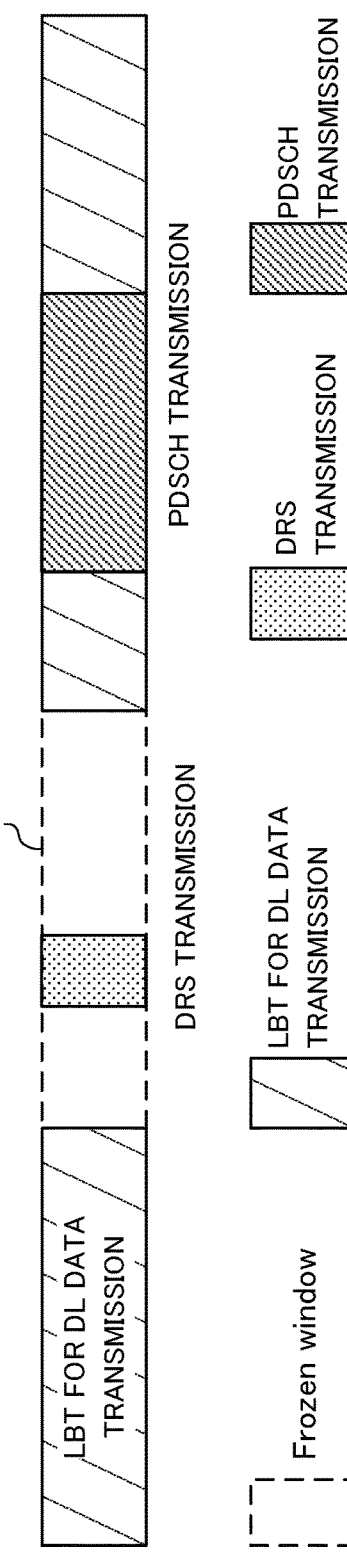
FIG. 6A
FIG. 6B
FIG. 6C
FIG. 6D

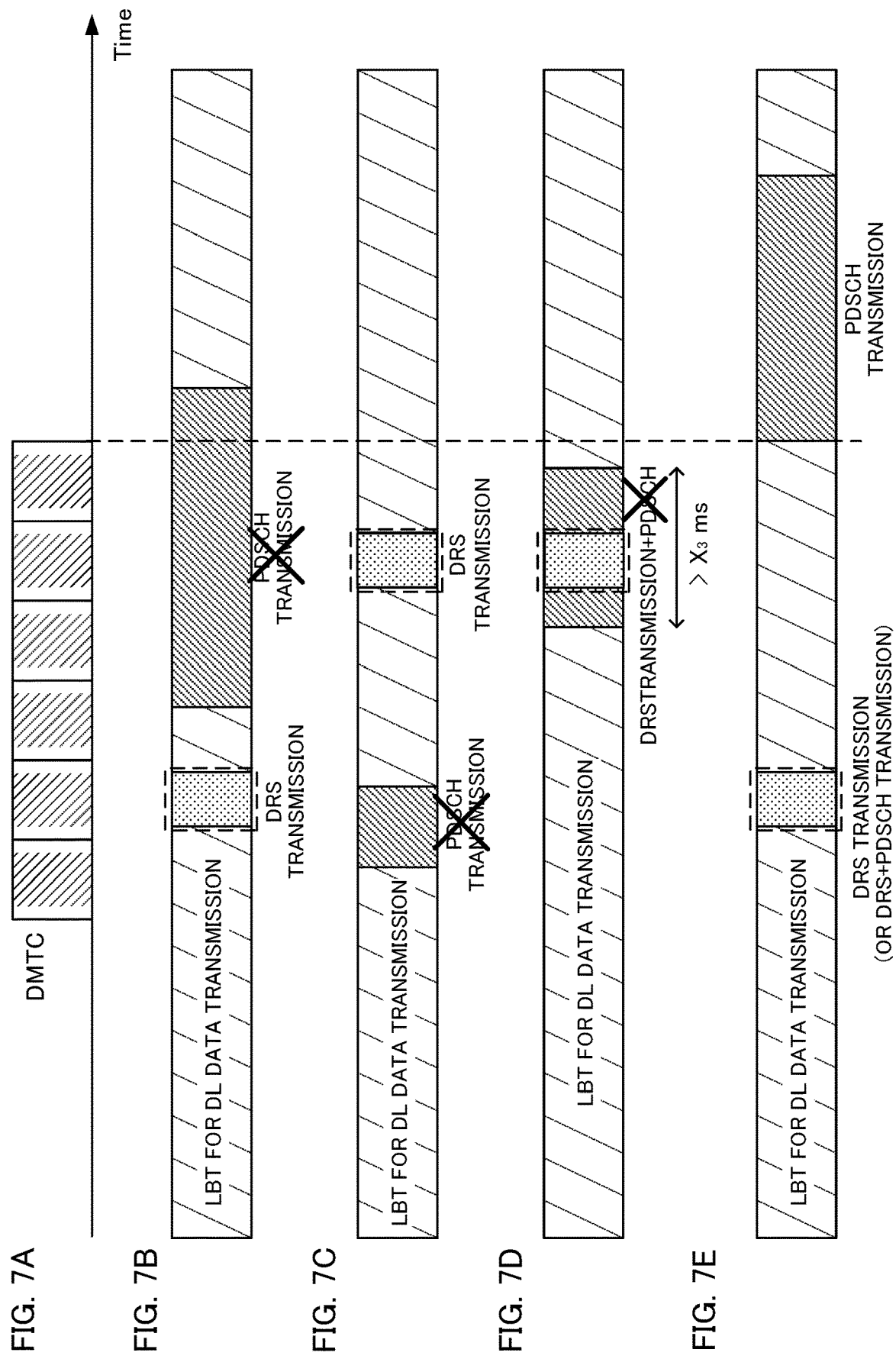

RADIO BASE STATION, USER TERMINAL AND RADIO COMMUNICATION METHOD

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2016/077932, filed on Sep. 23, 2016, which is based on and claims the benefit of priority of Japanese Patent Application No. 2015-187509 filed on Sep. 24, 2015. The entire contents of the aforementioned applications are incorporated herein by reference.

FIELD OF THE INVENTION

The present invention relates to a user terminal, a radio base station and a radio communication method in next-generation mobile communication systems.

BACKGROUND

In the UMTS (Universal Mobile Telecommunications System) network, the specifications of long term evolution (LTE) have been drafted for the purpose of further increasing high speed data rates, providing lower delays and so on (see non-patent literature 1). The specifications of LTE-advanced (Rel. 10 to 12) have been drafted for the purpose of achieving further broadbandization and higher speeds beyond LTE, and, in addition, for example, a successor system of LTE—referred to as "5G" (5th generation mobile communication system)—is under study.

The specifications of Rel. 8 to 12 LTE have been drafted assuming exclusive operations in frequency bands that are licensed to operators—that is, licensed bands. As licensed bands, for example, 800 MHz, 1.7 GHz and 2 GHz are used.

In recent years, user traffic has been increasing steeply following the spread of high-performance user terminals (UE: User Equipment) such as smart-phones and tablets. Although more frequency bands need to be added to meet this increasing user traffic, licensed bands have limited spectra (licensed spectra).

Consequently, a study is in progress with Rel. 13 LTE to enhance the frequencies of LTE systems by using bands of unlicensed spectra (also referred to as "unlicensed bands") that are available for use apart from licensed bands (see non-patent literature 2). For unlicensed bands, for example, the 2.4 GHz band and the 5 GHz band, where Wi-Fi (registered trademark) and Bluetooth (registered trademark) can be used, are under study for use.

To be more specific, with Rel. 13 LTE, a study is in progress to execute carrier aggregation (CA) between licensed bands and unlicensed bands. Communication that is carried out by using unlicensed bands with licensed bands like this is referred to as "LAA" (License-Assisted Access). Note that, in the future, dual connectivity (DC) between licensed bands and unlicensed bands and stand-alone in unlicensed bands may become the subject of study under LAA.

CITATION LIST

Non-Patent Literature

Non-Patent Literature 1: 3GPP TS 36. 300 "Evolved Universal Terrestrial Radio Access (E-UTRA) and Evolved Universal Terrestrial Radio Access Network (E-UTRAN); Overall Description; Stage 2"

Non-Patent Literature 2: AT&T, Drivers, Benefits and Challenges for LTE in Unlicensed Spectrum, 3GPP TSG-RAN Meeting #62 RP-131701

SUMMARY

In accordance with embodiments of the invention a radio base station is disclosed comprising: a transmitter that transmits downlink (DL) data and a measurement signal to a user terminal; and a processor that executes control of transmission of the DL data and the measurement signal based on a result of listening, which is performed before signals are transmitted, wherein the processor applies different conditions to listening that is performed before the DL data is transmitted and listening that is performed before the measurement signal is transmitted.

In some aspects of the radio base station, the processor controls the transmission of the DL data based on results of initial sensing and sensing based on a Contention Window (CW), and controls the transmission of the measurement signal based on a result of sensing in a predetermined period where a period for the sensing based on the CW is not configured.

In some aspects of the radio base station, the processor applies at least one of the initial sensing and a CW adjustment operation to the listening performed before the DL data is transmitted, and does not apply the adjustment operation to the listening performed before the measurement signal is transmitted.

In some aspects of the radio base station, the processor executes control of the listening to be performed before the measurement signal is transmitted to be performed in a range of a predetermined period, the predetermined period being configured in advance.

In some aspects of the radio base station, the transmitter makes a transmission period of the measurement signal, which is transmitted based on the result of listening, less than one subframe.

In some aspects of the radio base station, the processor controls the DL data to not be transmitted in at least one of: a period in which the measurement signal is transmitted, a whole period in a candidate transmission period for the measurement signal, and a partial period in the candidate transmission period for the measurement signal.

In some aspects of the radio base station, the DL data is a Physical Downlink Shared Channel (PDSCH) and the measurement signal is a discovery signal.

In accordance with embodiments of the invention, a user terminal is disclosed comprising: a receiver that receives downlink (DL) data and a measurement signal that are transmitted from a radio base station based on results of listening; and a processor that executes control of receipt of the DL data and the measurement signal, wherein different conditions are applied to listening that is performed before the DL data is transmitted and to listening that is performed before the measurement signal is transmitted.

In accordance with embodiments of the invention, a radio communication method is disclosed comprising the steps of: executing listening before transmitting DL data and before transmitting a measurement signal; and transmitting the DL data and the measurement signal based on listening results, wherein different conditions are applied to the listening that is performed before the DL data is transmitted and the listening that is performed before the measurement signal is transmitted.

BRIEF DESCRIPTION OF THE DRAWINGS

FIGS. 5A, 5B, 5C, and 5D are diagrams, each showing an example of listening operation according to a second embodiment;

FIGS. 6A, 6B, 6C, and 6D are diagrams, each showing an example of listening operation according to a second embodiment;

FIGS. 7A, 7B, 7C, 7D, and 7E are diagrams, each showing another example of listening operation according to a second embodiment;

DETAILED DESCRIPTION

Figure 1A:
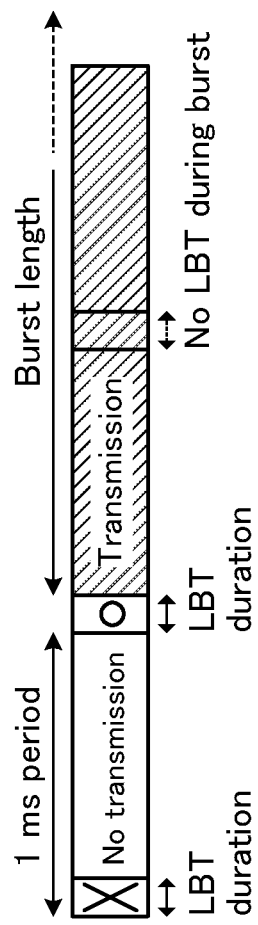
FIGS. 1A and 1B provide diagrams, each showing an example of a radio frame configuration in LBT.

For unlicensed bands, a study is in progress to introduce interference control functionality in order to allow co-presence with other operators' LTE, Wi-Fi or other different systems. In Wi-Fi, LBT (Listen Before Talk), which is based on CCA (Clear Channel Assessment), is used as an interference control function for use within the same frequency.

Consequently, when unlicensed bands are configured in LTE systems, UL transmission and/or DL transmission may be controlled by implementing "listening" (for example, LBT) as an interference control function.

Furthermore, unlicensed band cells are under study to transmit signals for use by UEs for RRM (Radio Resource Management) measurements and so on (referred to as, for example, "discovery signals" (DSs). When a radio base station transmits DL data and a discovery signal at different timings, the radio base station might perform listening before transmitting the DL data (for example, the PDSCH, the Physical Downlink Control Channel (PDCCH)/Enhanced PDCCH (EPDCCH), etc.) and before transmitting the discovery signal. In this case, one potential question is how to perform listening before each DL transmission.

One or more embodiments of present invention provide a radio base station, a user terminal and a radio communication method that enable adequate DL transmission even when measurement signals and DL data are transmitted at different timings in cells where pre-transmission listening is employed.

According one or more embodiments of the present invention, a radio base station has a transmission section that transmits DL data and a measurement signal to a user terminal, and a control section that controls the transmission of the DL data and the measurement signal based on the result of listening, which is performed before signals are transmitted, and, in this radio base station, the control section applies different conditions to the listening that is performed before the DL data is transmitted and the listening that is performed before the measurement signal is transmitted.

Advantageously, according to one or more embodiments the present invention, adequate DL transmission is possible even when measurement signals and DL data are transmitted at different timings in cells where pre-transmission listening is employed.

As mentioned earlier, in systems that run LTE/LTE-A in unlicensed bands (for example, LAA systems), interference control functionality is likely to be necessary in order to allow co-presence with other operators' LTE, Wi-Fi, or other different systems. Note that systems that run LTE/LTE-A in unlicensed bands may be collectively referred to as "LAA," "LAA-LTE," "LTE-U," "U-LTE" and so on, regardless of whether the mode of operation is CA, DC or SA.

Generally speaking, when a transmission point (for example, a radio base station (eNB), a user terminal (UE) and so on) that communicates by using a carrier (which may also be referred to as a "carrier frequency," or simply a "frequency") of an unlicensed band detects another entity (for example, another UE) that is communicating in this unlicensed band carrier, the transmission point is disallowed to make transmission in this carrier.

In this case, the transmission point executes listening (LBT) at a timing that is a predetermined period ahead of a transmission timing. To be more specific, by executing LBT, the transmission point searches the whole applicable carrier band (for example, one component carrier (CC)) at a timing that is a predetermined period ahead of a transmission timing, and checks whether or not other devices (for example, radio base stations, UEs, Wi-Fi devices and so on) are communicating in this carrier band.

Note that, in the present description, "listening" refers to the operation that a given transmission point (for example, a radio base station, a user terminal, etc.) performs before transmitting signals in order to check whether or not signals to exceed a predetermined level (for example, predetermined power) are being transmitted from other transmission points. Also, this "listening" performed by radio base stations and/or user terminals may be referred to as "LBT," "CCA," "carrier sensing" and so on.

The transmission point then carries out transmission using this carrier only if it is confirmed that no other devices are communicating. If the received power measured during LBT (the received power during the LBT period) is equal to or lower than a predetermined threshold, the transmission point judges that the channel is in the idle state ($LBT_{idle}$), and carries out transmission. When a "channel is in the idle state," this means that, in other words, the channel is not occupied by a specific system, and it is equally possible to say that a channel is "idle," a channel is "clear," a channel is "free," and so on.

On the other hand, if only just a portion of the target carrier band is detected to be used by another device, the transmission point stops its transmission. For example, if the transmission point detects that the received power of a signal from another device entering this band exceeds a threshold, the transmission point judges the channel is in the busy state ($LBT_{busy}$), and makes no transmission. In the event $LBT_{busy}$ is yielded, LBT is carried out again with respect to this channel, and the channel becomes available for use only after it is confirmed that the channel is in the idle state. Note that the method of judging whether a channel is in the idle state/busy state based on LBT is by no means limited to this.

As LBT schemes, FBE (Frame Based Equipment) and LBE (Load Based Equipment) are currently under study. Differences between these include the frame configurations to use for transmission/receipt, the channel-occupying time, and so on. In FBE, the LBT-related transmitting/receiving configurations have fixed timings. Also, in LBE, the LBT-related transmitting/receiving configurations are not fixed in the time direction, and LBT is carried out on an as-needed basis.

To be more specific, FBE has a fixed frame cycle, and is a mechanism of carrying out transmission if the result of executing carrier sensing for a certain period (which may be referred to as "LBT duration" and so on) in a predetermined frame shows that a channel is available for use, and not making transmission but waiting until the next carrier sensing timing if no channel is available (see FIG. 1A).

Figure 1B:
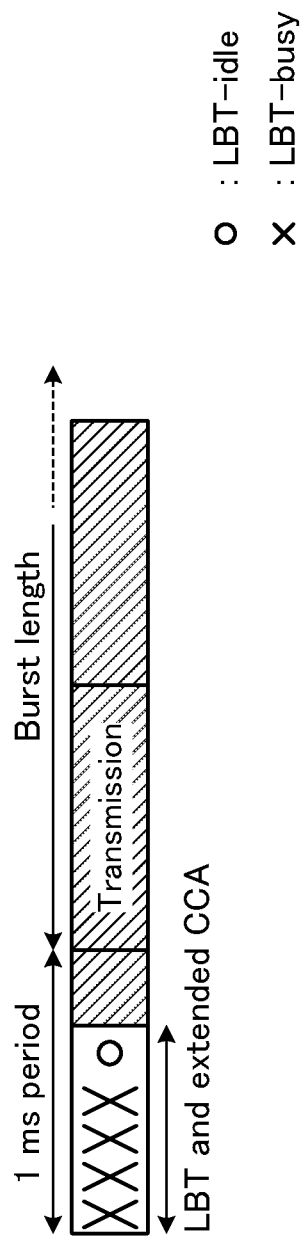

On the other hand, LBE refers to a mechanism for implementing the ECCA (Extended CCA) procedure of extending the duration of carrier sensing when the result of carrier sensing (initial CCA) shows that no channel is available for use, and continuing executing carrier sensing until a channel is available. In LBE, random backoff is required to adequately avoid contention (see FIG. 1B).

Note that the duration of carrier sensing (also referred to as the "LBT duration," "carrier sensing period," etc.) refers to the time (for example, one symbol, or a duration of time that is shorter than one symbol) it takes to gain one LBT result by performing listening and/or other processes and deciding whether or not a channel can be used.

A transmission point can transmit a predetermined signal (for example, a channel reservation signal) based on the result of LBT. Here, the result of LBT refers to information about the state of channel availability (for example, "$LBT_{idle}$," "$LBT_{busy}$," etc.), which is acquired by LBT in carriers where LBT is configured. Transmission from other systems and/or the like can be blocked by transmitting channel reservation signals.

As described above, by introducing interference control that is based on LBT mechanism and that is for use within the same frequency to transmission points in LAA systems, it becomes possible to prevent interference between LAA and Wi-Fi, interference between LAA systems and so on. Furthermore, even when transmission points are controlled independently per operator that runs an LAA system, LBT makes it possible to reduce interference without learning the details of each operator's control.

Now, in LAA systems, to configure and/or reconfigure unlicensed band SCells (Secondary Cells) in UEs, a UE has to detect SCells that are present in the surroundings by means of RRM (Radio Resource Management) measurements, measure their received quality, and then send a report to the network. The signal to allow RRM measurements in LAA is under study based on the discovery reference signal (DRS) stipulated in Rel. 12.

Note that the signal for RRM measurements in LAA may be referred to as the "detection/measurement signal," the "discovery reference signal" (DRS), the "discovery signal" (DS), the "LAA DRS," the "LAA DS," and so on. Also, an unlicensed band SCell may be referred to as, for example, an LAA SCell.

Similar to the Rel. 12 DRS, the LAA DRS may be constituted by a combination of synchronization signals (PSS (Primary Synchronization Signal)/SSS (Secondary Synchronization Signal)) and a CRS (Cell-specific Reference Signal) of existing systems (for example, LTE Rel. 10 to 12), a combination of synchronization signals (PSS/SSS), a CRS and a CSI-RS (Channel State Information Reference Signal) of existing systems, and so on.

Also, the network (for example, eNBs) can configure the DMTC (Discovery Measurement Timing Configuration) of the LAA DRS in UEs on a per frequency basis. The DMTC contains information about the transmission cycle of DRSs (which may be also referred to as "DMTC periodicity" and so on), DRS measurement timing offsets, and so on.

The DRS is transmitted per DMTC periodicity, in the DMTC duration. Here, according to Rel. 12, the DMTC duration is fixed to 6 ms. Also, the length of the DRS (which may be also referred to as the "DRS occasion," the "DS occasion," the "DRS burst," the "DS burst" and so on) that is transmitted in the DMTC duration is between 1 ms and 5 ms. In LAA, too, the same configurations may be used, which is under study. For example, taking the duration of LBT into account, the DRS occasion in the LAA DRS may be made shorter than one subframe, or may be made equal to or longer than one subframe.

A UE learns the timings and the cycle of LAA DS measurement periods based on the DMTC reported from the network, and executes LAA DS measurements. Furthermore, a study is in progress to carry out CSI measurements by using the DRS, in addition to RRM measurements. For example, CSI measurements can be performed by using, for example, the CRS, the CSI-RS and so on, included in the DRS.

Also, when a DRS is to be transmitted in an unlicensed band, this DRS may be transmitted in synchronization with a transmission timing of DL data (for example, the PDSCH, the PDCCH/EPDCCH, etc.). In this case, if the result of listening that is performed before the DL data is transmitted shows the idle state, the radio base station can transmit the DL data and the DRS in a predetermined burst period.

Meanwhile, from the perspective of improving the accuracy of DL measurements in this unlicensed band, the radio base station might transmit DL data and discovery signals at different timings. In particular, when DL data transmission does not take place for a long period, making DRS transmission apart from DL data transmission is effective. In this case, the question may be how to execute listening before every DL transmission. One possible method is to allow the radio base station to execute listening of the same conditions before transmitting DL data and before transmitting discovery signals.

Regarding this, the present inventors have focused on the point that the opportunities to transmit DRSs (transmission periods and so on) are limited in comparison to DL data transmission. For example, it might occur that DRSs are transmitted within a range of a predetermined candidate transmission period (for example, DMTC periodicity), and this candidate transmission period is also configured in a long cycle (for example, DMTC periodicity). Also, the present inventors have focused on the threat that channel reservation signals, which are transmitted based on the result of LBT ($LBT_{idle}$), DL data transmission during the DMTC duration and so on might block the transmission of DRSs in neighboring cells.

So, the present inventors have found out that applying a mechanism that places a priority on securing as many DRS transmission opportunities as possible (by, for example, simplifying the listening operation, prioritizing DRM transmission in the DMTC duration, and so on) to the listening prior to DRS transmission (listening for DRSs) is effective for DRS transmission in unlicensed bands.

Then, the present inventors have come up with the idea of applying different conditions between the listening for DL data transmission and the listening for DRSs. Different conditions may include the processing operation in listening, the timing to execute listening (transmission period) and so on. For example, the present inventors have come up with the idea of controlling at least one of the timing of listening for DRSs, the timing of listening for DL data transmission and the timing of DL data transmission, by taking into consideration the DMTC duration and so on.

Now, embodiments of the present invention will be described in detail below with reference to the accompanying drawings. Although the following embodiments will be described assuming that a carrier where listening is configured is an unlicensed band, this is by no means limiting. The embodiments herein are applicable to any frequency carriers (or cells, CCs, etc.), in which listening is configured, regardless of whether a frequency carrier is a licensed band or an unlicensed band.

Also, although cases will be shown in the following description where listening is employed in LTE/LTE-A systems, the embodiments herein are by no means limited to this. The embodiments herein are applicable to any structures in which listening is performed before signals are transmitted and measurement signals and DL data signals are transmitted at different timings.

First Example

A case will be described with a first example where the listening operation (LBT operation) to execute before DRS transmission (DRS burst) and the listening operation to execute before DL data transmission (or the listening operation in Wi-Fi) are configured differently.

Figure 2:
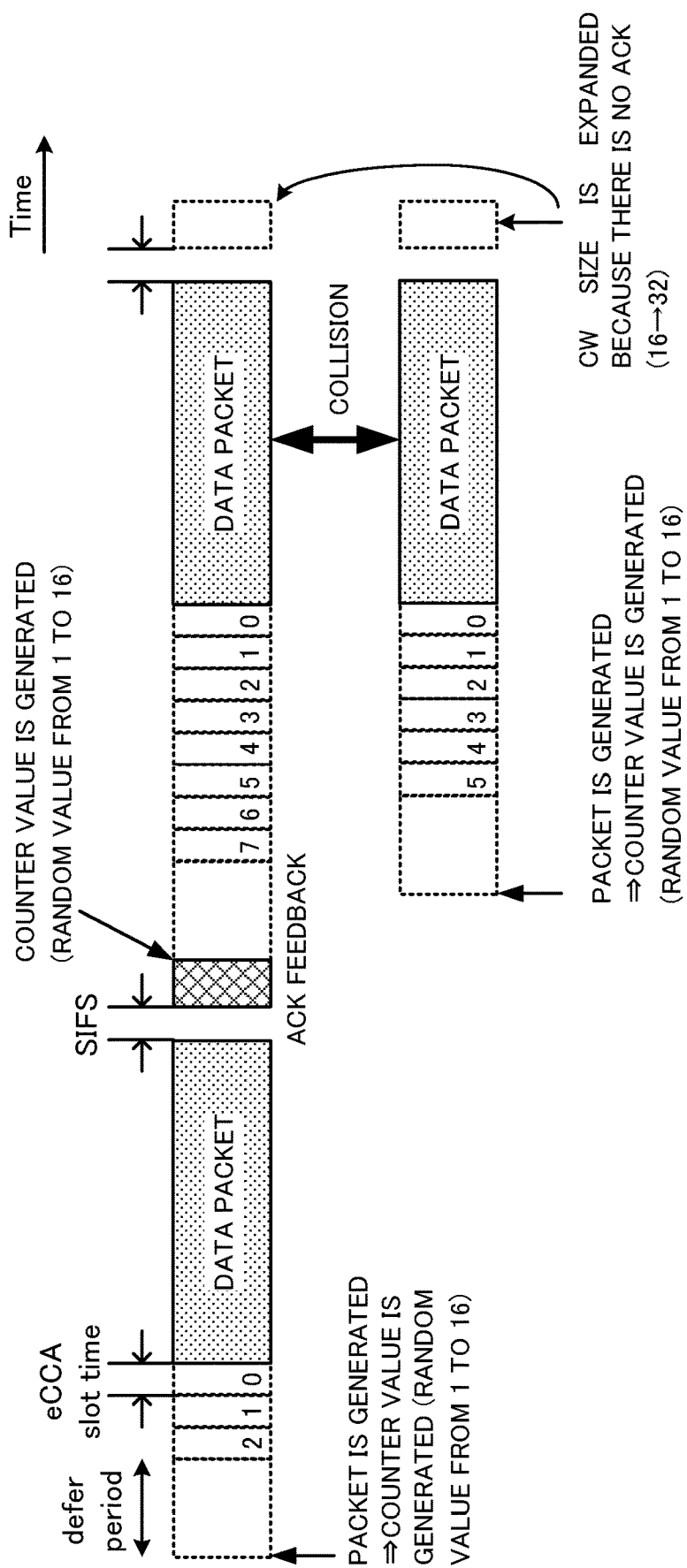
FIG. 2 is a diagram to show an example of a case where random backoff is applied to listening in accordance with embodiments of the invention.

FIG. 2 shows an example of listening that is performed before DL data (for example, the PUSCH) is transmitted. FIG. 2 shows a case where a mechanism that applies random backoff to listening and that makes the window size in random backoff variable is employed. Note that FIG. 2 by no means limits the listening operations that are applicable to DL data transmission.

Random backoff refers to the mechanism, whereby, even when a channel enters the idle state, each transmission point does not start transmission soon, but defers transmission for a randomly-configured period and then starts transmission when the channel is clear. By this means, transmission opportunities are distributed among a plurality of transmission points, and fairness is guaranteed. The window size in random backoff (also referred to as "contention window" (CW)) refers to the window size for determining the range of the backoff period, which is configured randomly.

The backoff period that is configured in each transmission point can be determined based on counter values (random values), which are configured on a random basis. The range of counter values is determined based on the contention window (CW) size, and, for example, the counter values are configured on a random basis from the range from 0 to the CW size (integer value).

A transmission point generates a counter value for random backoff when judging, based on initial CCA, that a channel is in the idle state. Then, the transmission point keeps the counter value until it is confirmed that the channel has been idle for a predetermined period of waiting time (also referred to as "defer period" (D_eCCA)). When it is confirmed that the channel has been idle for predetermined period, the transmission point can then perform sensing in a predetermined time unit (for example an eCCA slot time unit), lower the counter value if the channel is idle, and make transmission when the counter value becomes zero.

In random backoff, the counter value is determined from a range that is associated with the CW size. FIG. 2 shows a case where a random value is detected, from among 1 to 16, as the backoff period. Furthermore, the CW size may be changed depending on the result of ACK/NACK feedback from the receiving end. For example, when a DL data packet is transmitted from a transmission point and yet no ACK is returned from the receiving end, the transmission point can judge that a collision has occurred, and increase the CW size. FIG. 2 shows a case where the CW size is increased from 16 to 32 when there is no ACK feedback in response to packet transmission.

In this way, when listening for DL data transmission is used, DL data transmission is made if the result of initial listening (initial CCA) finds a channel in the idle state, or listening, to which random backoff is applied, is performed when the busy state is yielded. Note that FIG. 2 by no means limits the listening operation that can be applied to DL data transmission in LAA. For example, the operation of adjusting the CW size may be changed based on conditions other than ACK/NACK results.

By contrast with this, as for the listening to execute before DRS transmission, a radio base station can be configured to execute this listening without executing initial listening (initial CCA) and/or without adjusting the CW size (CW adjustment). For example, the case where listening is performed by configuring a predetermined defer period, a CCA duration, and a backoff period (counter value) (method 1), and the case where listening is performed by configuring the backoff period (counter value) to 0 (method 2) may be applicable.

<Method 1>

Figure 3B:
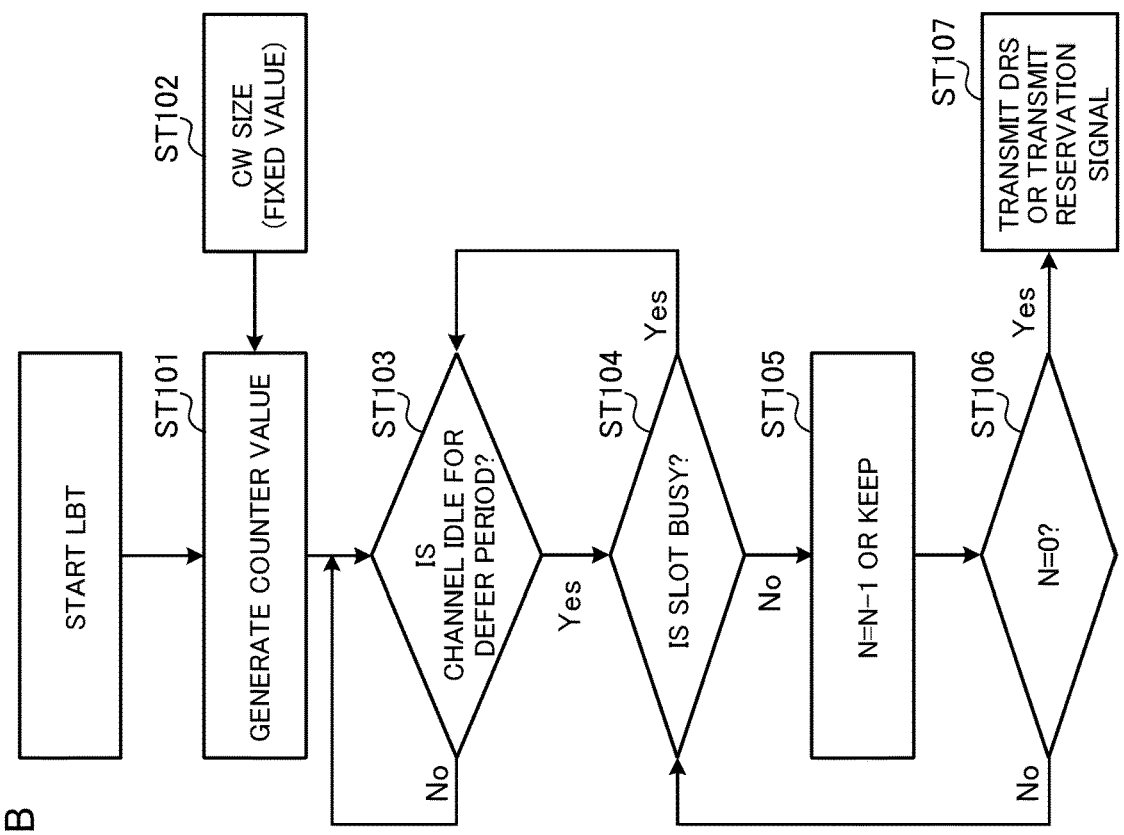
FIG. 3B is a diagram to show an example of listening operation in accordance with embodiments of the invention according to a first example.
Figure 3A:
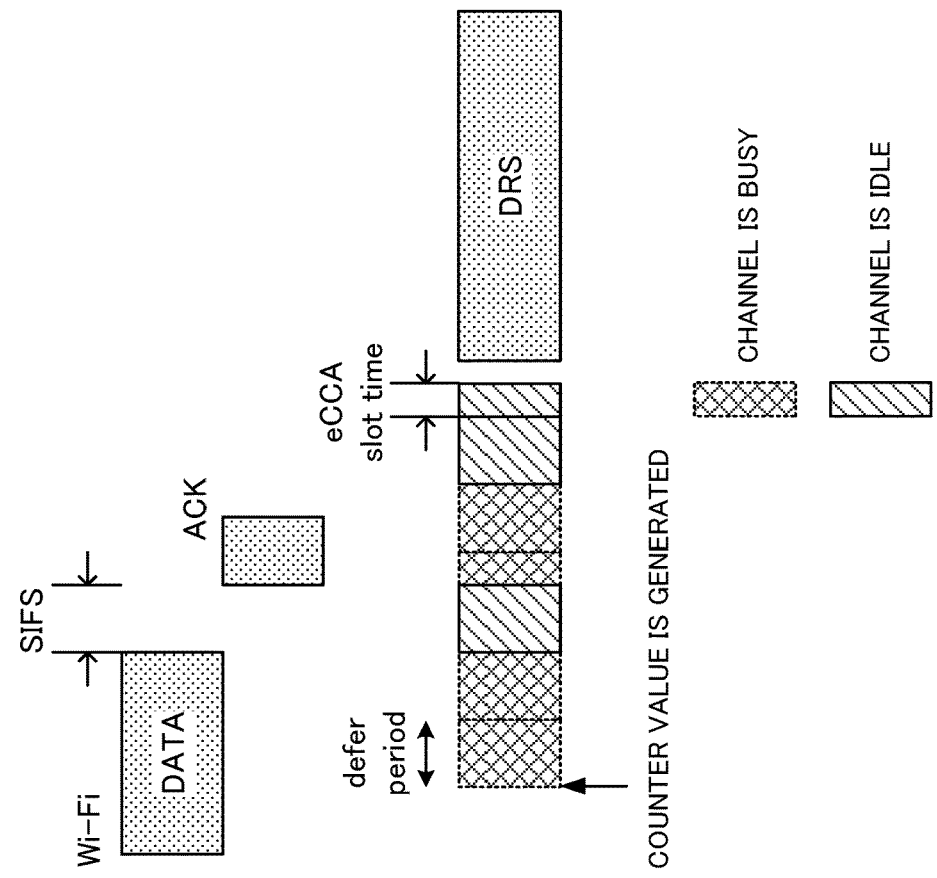
FIG. 3A is a diagram to show an example of configuring a defer period, a CCA duration and a backoff period.

FIGS. 3A and 3B show an example of the case where listening is performed by configuring a predetermined defer period, a CCA duration, and a backoff period (counter value). FIG. 3A assumes a case where the defer period is configured to 16 μs, the CCA (slot) duration is configured to 9 μm and the counter value is configured to 1. The conditions to apply to listening are by no means limited to the example shown in FIGS. 3A and 3B.

The defer period is configured to be longer than the time interval (SIFS) between the timing data transmission is finished in another system (for example, Wi-Fi) and the timing a delivery acknowledgement signal (ACK) later starts being transmitted as feedback. The counter value N may be a predetermined value (for example, N=1), or can be selected from fixed CW sizes. Furthermore, in order to transmit DRSs in synchronization with DRS transmission timings in other cells, a radio base station may operate to defer, and not transmit, DRSs even when the counter value becomes zero (self-deferral procedure). In this case, the radio base station waits in the state in which the counter value is 1 (the counter value is not allowed to be 0).

Now, an example of the listening operation in method 1 will be shown with reference to FIG. 3B. First, a radio base station generates a counter value (N) in order to use random backoff (ST101). The counter value (N) may be a predetermined value (for example, 1), or may be an integer value selected from CW sizes that are defined on a fixed basis (ST102). After generating the counter value, the radio base station checks whether a channel has been idle for a predetermined period (defer period) (ST103).

Upon confirming that a channel is idle in the predetermined period (ST103: Yes), the radio base station performs sensing in a predetermined slot duration unit (for example, an enhanced CCA (eCCA) duration unit), and checks the channel state (ST104). If the channel state is the busy state (ST104: Yes), the radio base station checks, again, if the channel has been idle for a predetermined period (defer period) (ST103).

If the channel state shows the idle state (ST104: No), the radio base station decrements the counter value by one, or keeps the counter value without doing anything (ST105). The radio base station continues performing sensing in slot-time units until the counter value becomes zero (ST104 to ST105), and, when the counter value becomes zero (ST106: Yes), transmits DRSs (DL burst transmission) or transmits reservation signals, depending on the need (ST107).

Note that the radio base station makes transmission (that is, transmits DRSs at predetermined timings) in synchronization with DRS transmission timings in other cells, the radio base station may operate to defer, and not transmit, DRSs even when the counter value becomes zero (self-deferral procedure) (ST105 or ST107).

In this way, by performing LBT-listening operation without executing initial listening (initial CCA) and/or adjusting the CW size (CW adjustment), it is possible to transmit DRSs more quickly than is possible with the listening for DL data transmission. By this means, even when DRSs are transmitted at different timings from those of DL data, it is still possible to secure opportunities for transmitting the DRSs.

<Method 2>

Figure 4B:
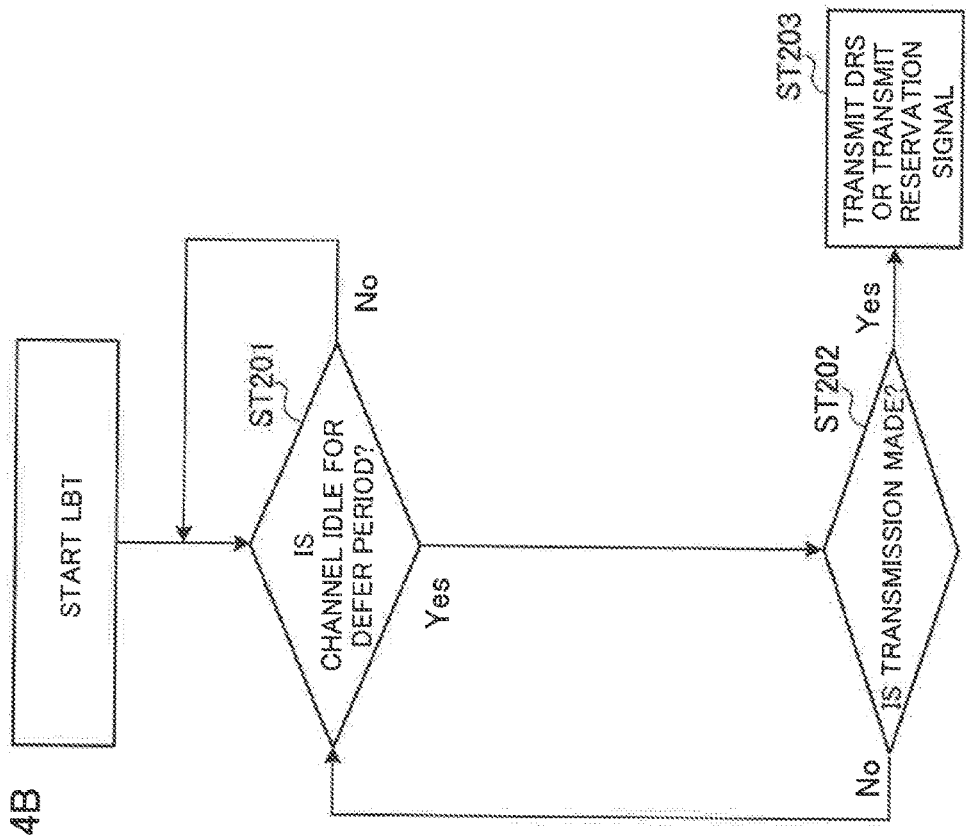
FIG. 4B is a diagram to show another example of listening operation in accordance with embodiments of the invention according to the first example.
Figure 4A:
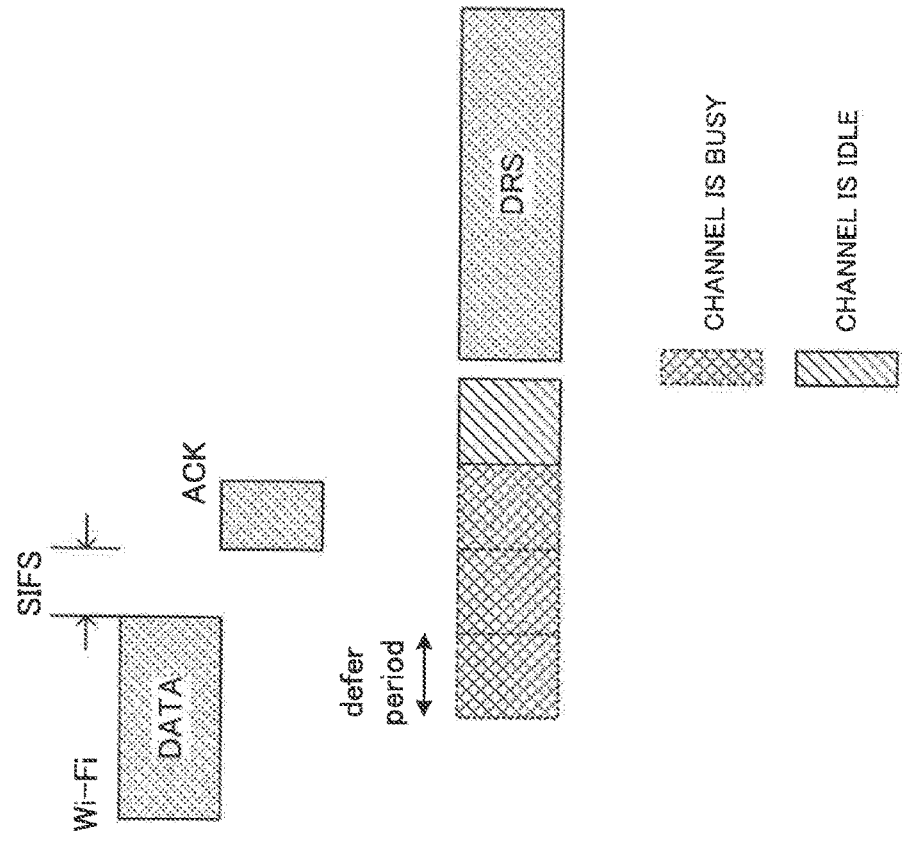
FIG. 4A is a diagram to show an example of a case in which a CCA duration is not configured.

FIGS. 4A and 4B show an example of the case where listening is performed by configuring the backoff period (counter value) to 0. FIG. 4A shows a case where the defer period is configured to 25 µs and the counter value is configured to 0 (and where the CCA duration is not configured). The conditions to apply to listening are not limited to the example shown in FIGS. 4A and 4B.

The defer period is configured to be longer than the time interval (SIFS) between the timing data transmission is finished in another system (for example, Wi-Fi) and the timing a delivery acknowledgement signal (ACK) later starts being transmitted as feedback. Furthermore, when the radio base station judges, at a timing before a candidate DRS transmission period (DMTC duration), that the channel in the idle state in a predetermined (defer period), the radio base station needs to transmit reservation signals until the candidate DRS transmission period arrives.

An example of listening operation according to method 2 will be described with reference to FIG. 4B. The radio base station checks whether the channel has been idle for a predetermined period (defer period), without generating a counter value (ST201). IF the radio base station successfully confirms that the channel has been idle for a predetermined period (ST201: Yes), the radio base station decides whether or not to make DRS transmission (ST202). When deciding to make DRS transmission (ST202: Yes), the radio base station transmits DRSs or transmits reservation signals (ST203).

In this way, by configuring the counter value to 0, it is possible to transmit DRSs quickly compared to the listening for DL data transmission. By this means, even when DRSs are transmitted at different timings than DL data, it is still possible to secure opportunities for transmitting the DRSs.

Second Example

A case will be described with a second example where the period for listening, performed prior to DRS transmission, is configured to a predetermined period (for example, limited to a predetermined period). The predetermined period configured to execute listening may be referred to as the "active window" the "window," the "listening window," and so on.

The predetermined period (listening window) to perform listening for DRS transmission can be configured based on the DMTC duration, which is a candidate DRS transmission period (see FIGS. 5A-5D). For example, the listening window for DRS transmission can be made the same period as the DMTC shown in FIG. 5A.

Although FIG. 5A shows a case in which, as an example DMTC duration, a DMTC duration is formed with six subframes, this is by no means the only DMTC duration that can be configured. Also, although FIG. 5A shows a case where the length of the DRS (DRS occasion) that is transmitted in the DMTC duration is configured to be less than one subframe, the present embodiment is by no means limited to this.

Also, the listening window for DRS transmission may be a period that is defined by shifting forward the top (starting point) of a DMTC duration in time by a predetermined value ($X_2$ µs), and/or by shifting forward the end (end point) of the DMTC duration by a predetermined value ($Y_2$ µs) (see FIGS. 5B and 5C). By this means, it is possible to perform listening immediately before the period in which DRSs are transmitted (for example, the DMTC duration), so that it is possible to transmit DRSs from the top of a candidate DRS transmission period depending on the result of listening.

Note that, when the DRS occasion is configured to be less than one subframe, this results in a configuration in which DRSs are not transmitted in the top portion or the end portion of one subframe. In this case, $X_2$ and/or $Y_2$ can be configured to 0, considering the period in which DRSs are transmitted.

Also, a listening window for DRS transmission can be divided and configured, considering the period DRSs are transmitted in the DMTC duration (see FIG. 5D). In this case, the radio base station may be configured to transmit information about the starting locations of candidate DRS locations and the time of transmission, or information about the boundaries of subframes where DRSs are arranged, to the user terminal.

The radio base station, when successfully transmitting a DRS based on a result of listening ($LBT_{idle}$) in a DRS transmission listening window, may exert control not to perform any more LBT operation during the rest of the listening window (see FIG. 5B). By this means, unnecessary listening operations can be avoided.

Furthermore, the radio base station may configure the backoff counter value at the end of a given listening window as the backoff counter value at the beginning of the next listening window (see FIG. 5C). FIG. 5C illustrates a case where the counter value in a given listening window decreases from 2 to 1 and thereupon this listening window ends, and where, in the next listening window, listening is performed by configuring the counter value to 1. By this means, even when a channel is busy (when the busy state continues), it is still possible secure opportunities for transmitting DRSs.

Third Example

A case will be described with a third example where the listening that is performed before DL data transmission (for example, the PDSCH) is not performed in part or all of the DRS transmission period and/or the DMTC duration. The period in which the listening for DL data transmission is not performed (limited) will also be referred to as the "frozen window."

The period to limit the listening for DL data transmission can be configured in part of the DRS transmission period and/or the DMTC duration, or can be configured in the whole of the DMTC duration (see FIGS. 6A-6D). FIG. 6A shows an example DMTC duration. Although FIG. 6A shows a case of forming a DMTC duration with 6 subframes, this is by no means the only DMTC duration that can be configured. Also, although FIG. 6A shows a case in which the length of the DRS occasion transmitted in the DMTC duration is configured to less than one subframe, the present embodiment is by no means limited to this.

FIG. 6B shows a case where the period in which the radio base station transmits DRSs is configured as the period to limit the listening for DL data transmission (frozen window). In this case, the period to limit the listening for DL data transmission can be limited to the DRS transmission period and thus can be configured short, so that it is possible to reduce the loss of DL data (for example, PDSCH) transmission opportunities.

Also, when the period to transmit DRSs is configured as a frozen window, the radio base station may limit the DL data transmission period. The case where the DL data transmission period is limit will be described with reference to FIGS. 7A-7E. FIG. 7A shows an example DMTC duration.

For example, as shown in FIG. 7B, the radio base station limits the DL data transmission after the DRS transmission in the DMTC duration (limitation 1). By this means, it is possible to prevent this DL data transmission from influencing the listening for DRS transmission in other cells.

Also, as shown in FIG. 7C, the radio base station may limit DL data transmission not to be accompanied by DRS transmission (so that DL data and DRSs are not transmitted at the same time) in the DMTC duration (limitation 2). DL data transmission accompanied by DRS transmission refers to the case where DRSs (CRSs, PSS/SSS (CSI-RSs may be included as well)) and DL data (for example, the PUSCH) are multiplexed in the same subframe and transmitted.

Also, as shown in FIG. 7D, even when DL data transmission accompanied by DRS transmission is made (DL data and DRSs are transmitted at the same time) in the DMTC duration, if the DL data transmission exceeds a predetermined period $X_3$ (for example, $X_3=1$ ms), the radio base station limits the DL data transmission (limitation 3).

In this way, when the period to transmit DRSs is configured as a frozen window, the radio base station configures it is possible to make DL data transmission by applying at least one of above limitation 1 to limitation 3 to the DL data transmission. For example, when all of limitation 1 to limitation 3 are applied, the radio base station exerts control not to make DL data transmission in the DMTC duration except for the DRS-transmitting subframe (see FIG. 7E).

By this means, it is possible to prevent DL data transmission from influencing the listening for DRS transmission in other cells. Furthermore, since the listening for DL data transmission can be performed outside the period DRSs are transmitted, the radio base station can configure an early DL data transmission timing (for example, configure DL data transmission at a timing that is immediately after the DMTC duration) (see FIG. 7E).

FIG. 6C shows a case where the DMTC duration is configured as a period in which the listening for DL data transmission is limited (Frozen window). Also, a period that is longer than the DMTC duration may be configured as a frozen window.

By this means, it is possible to reduce the opportunities of DL data transmission in the DMTC duration, so that it is possible to reduce the impact the listening for DRS transmission has on DL data transmission. As a result, DRSs can be transmitted adequately during the DMTC duration.

Also, a frozen window may be a period that is defined by shifting forward the top (starting point) of the DMTC duration in time by a predetermined value ($X_2$ μm) and/or by shifting forward the end (end point) of the DMTC duration by a predetermined value ($Y_2$ 1 μm). By this means, it is possible to limit the listening for DL data transmission from immediately before the period DRSs are transmitted (for example, the DMTC duration), so that it is possible to effectively reduce the impact on the listening for DRSs.

Note that, when the DRS occasion is less than one subframe, a period in which DRSs are not transmitted may be configured in the top portion or the end portion of one subframe. In this case, it is preferable to configure $X_2$ and/or $Y_2$ to 0, considering the period in which DRSs are transmitted. Note that a frozen window may be the same period as the above-described listening window for DRS transmission, or may be different period.

FIG. 6D shows a case where part of the DMTC duration is configured as a period to limit the listening for DL data transmission (frozen window). Here, the first-half portion of the DMTC duration is configured as a frozen window, but this is by no means limiting. In this case, a partial period in the DMTC duration can be used for listening for DL data transmission (DL data transmission).

If the whole DMTC duration is made a frozen window (see FIG. 6C), the radio base station cannot perform listening for DL data transmission and/or transmit DL data in the DMTC duration following DRS transmission, even if no other cells (for example, cells that transmit DL data and/or DRSs) are present around the radio base station. Consequently, by making part of the DMTC duration a frozen window, it is possible to carry out DRS transmission adequately in the frozen window, and, furthermore, avoid reducing the transmission period for DL data transmission. In particular, by making the first-half portion of the DMTC duration a frozen window, it is possible to make DRS transmission early in the DMTC duration, and transmit DL data in the second-half portion.

Figure 8A:
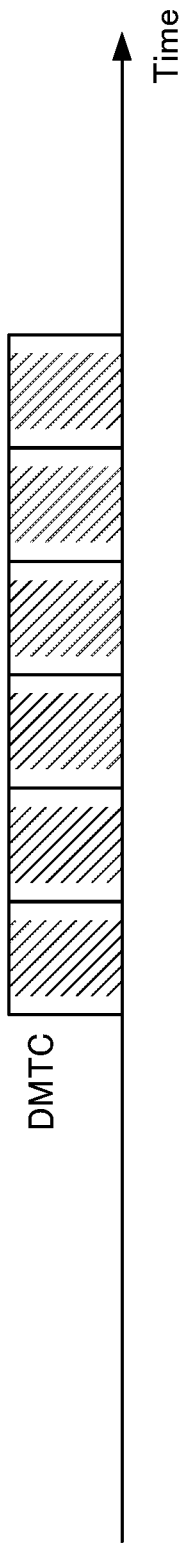
FIGS. 8A, 8B, 8C, and 8D are diagrams, each showing another example of listening operation according to a second embodiment.

Also, when part or the whole of the DMTC duration is made a frozen window in which the listening for DL data transmission is not performed (see FIGS. 6C and 6D), DL data transmission may be limited in the same way as the listening for DL data transmission is, or may be limited based on different conditions. Example cases of limiting the transmission of DL data (for example, the PUSCH) are shown in FIGS. 8A, 8B, 8C, and 8D. FIG. 8A shows an example DMTC duration.

Figure 8B:
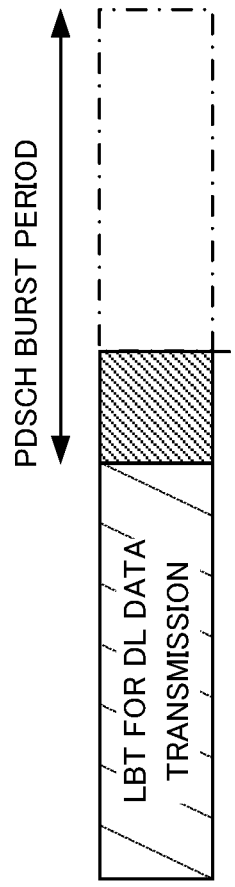

For example, as shown in FIG. 8B, the radio base station limits the DL data transmission in the DMTC duration. By this means, it is possible to prevent this DL data transmission from influencing the listening for DRS transmission in other cells.

Figure 8C:

Also, the radio base station only allows DL data transmission that is accompanied by DRS transmission (DL data transmission that is multiplexed with DRS transmission in the same subframe) in the DMTC duration, as shown in FIG. 8C. That is, the radio base station limits DL data transmission that is not accompanied by DRS transmission (DL data transmission that is not made with DRS transmission at the same time) in the DMTC duration.

Figure 8D:
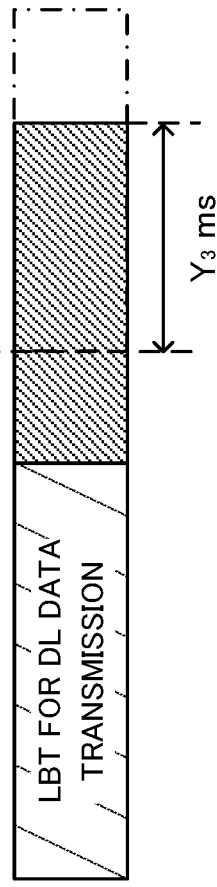

Furthermore, as shown in FIG. 8D, even when the radio base station makes DL data transmission that is accompanied by DRS transmission (that is carried out with DRS transmission at the same time) in the DMTC duration, if the DL data transmission exceeds a predetermined period $Y_3$ (for example, $Y_3$=2 ms), the radio base station limits this DL data transmission.

In this way, by controlling the timing of listening for DL data transmission and/or DL data transmission by taking the DMTC duration into consideration, it is possible to make DRS transmission adequately, at different timings than DL data, and, furthermore, reduce the loss of opportunities to transmit DL data.

Fourth Example

With a fourth example, the user terminal operation when a period (frozen window), in which the listening to be performed before DL data transmission is limited, is configured will be described.

User terminals in future communication systems may be provided with functions to support dynamic frequency selection (DFS) so that the user terminals can be controlled not to sense and interfere with radar frequencies (for example, weather radars and so on). In addition to this, if LBT is to be performed in situations where the volume of traffic is heavy, there is a high possibility that the defer period due to listening increases in unlicensed bands (unlicensed SCells).

Consequently, the present embodiments can be structured so that information about the period (frozen window) to limit the listening to be performed before DL data transmission is reported to a user terminal, and the user terminal monitors DL data based on this information. By this means, it is possible to reduce the increase of power consumption in the user terminal (battery saving).

In this case, in addition to using the DRX (discontinuous reception) control in existing LTE systems, the radio base station can configure cell-specific frozen windows, in which the listening for DL data transmission is limited, and report these to the user terminal. For example, the radio base station can report information about the frozen window configured in a predetermined cell (for example, an unlicensed cell) where listening is performed. In this case, the radio base station reports this information to the user terminal by using a common search space in downlink control information (DCI), by using higher layer signaling (for example, RRC signaling, broadcast information, etc.).

Figure 9:
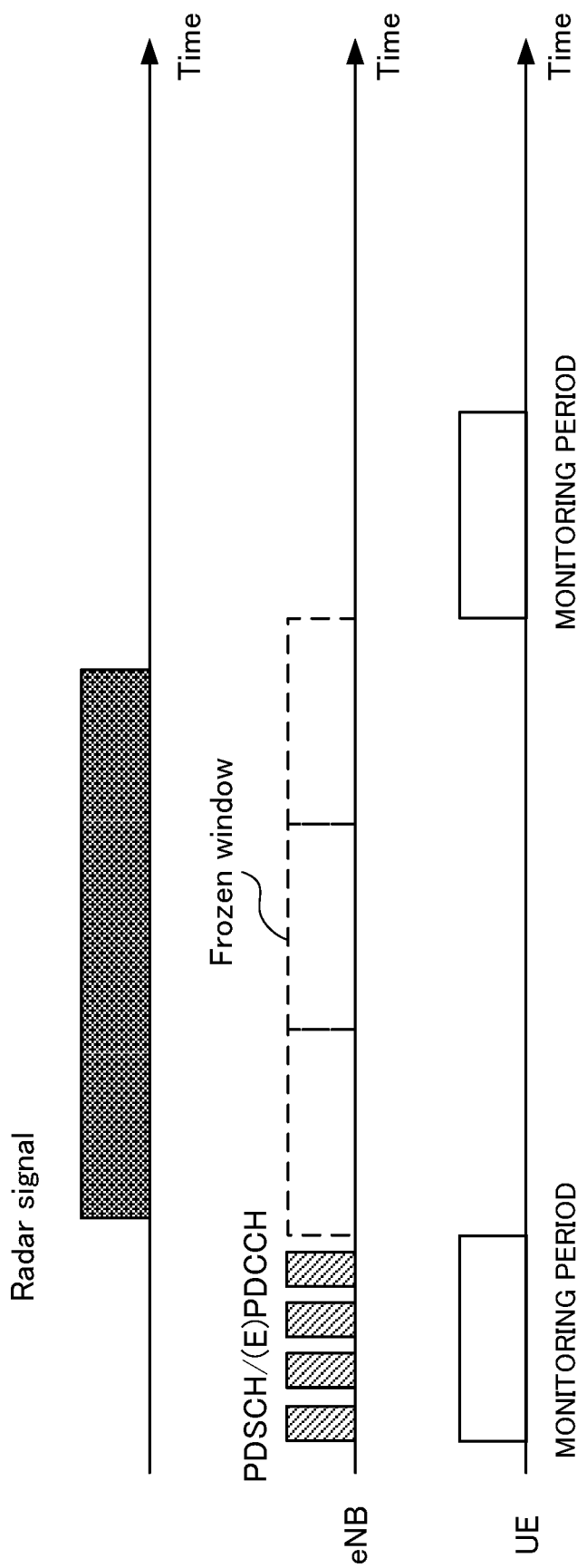
FIG. 9 is a diagram to show an example of monitoring operation in a user terminal according to a fourth example.

Upon receiving the information about the predetermined cell's frozen window, the user terminal executes control not to monitor DL data (for example, the PDSCH, the PDCCH/EPDCCH, etc.) in the period in which this predetermined cell's frozen window is configured (see FIG. 9). The radio base station may report one frozen window to the user terminal, or may configure a plurality of candidate periods (frozen windows) in advance by higher layer signaling, and report a specific period to the user terminal, on a dynamic basis, in downlink control information (DCI).

In this way, apart from existing DRX, a user terminal is controlled to monitor or not monitor DL data depending on the frozen window that is configured in each unlicensed band, so that it is possible to reduce the increase of power consumption in the user terminal.

(Structure of Radio Communication System)

Now, the structure of the radio communication system according to one or more embodiments of the present invention will be described below. In this radio communication system, the radio communication methods according to the embodiments of the present invention are employed. Note that the radio communication methods of the above-described examples may be applied individually or may be applied in combination.

Figure 10:
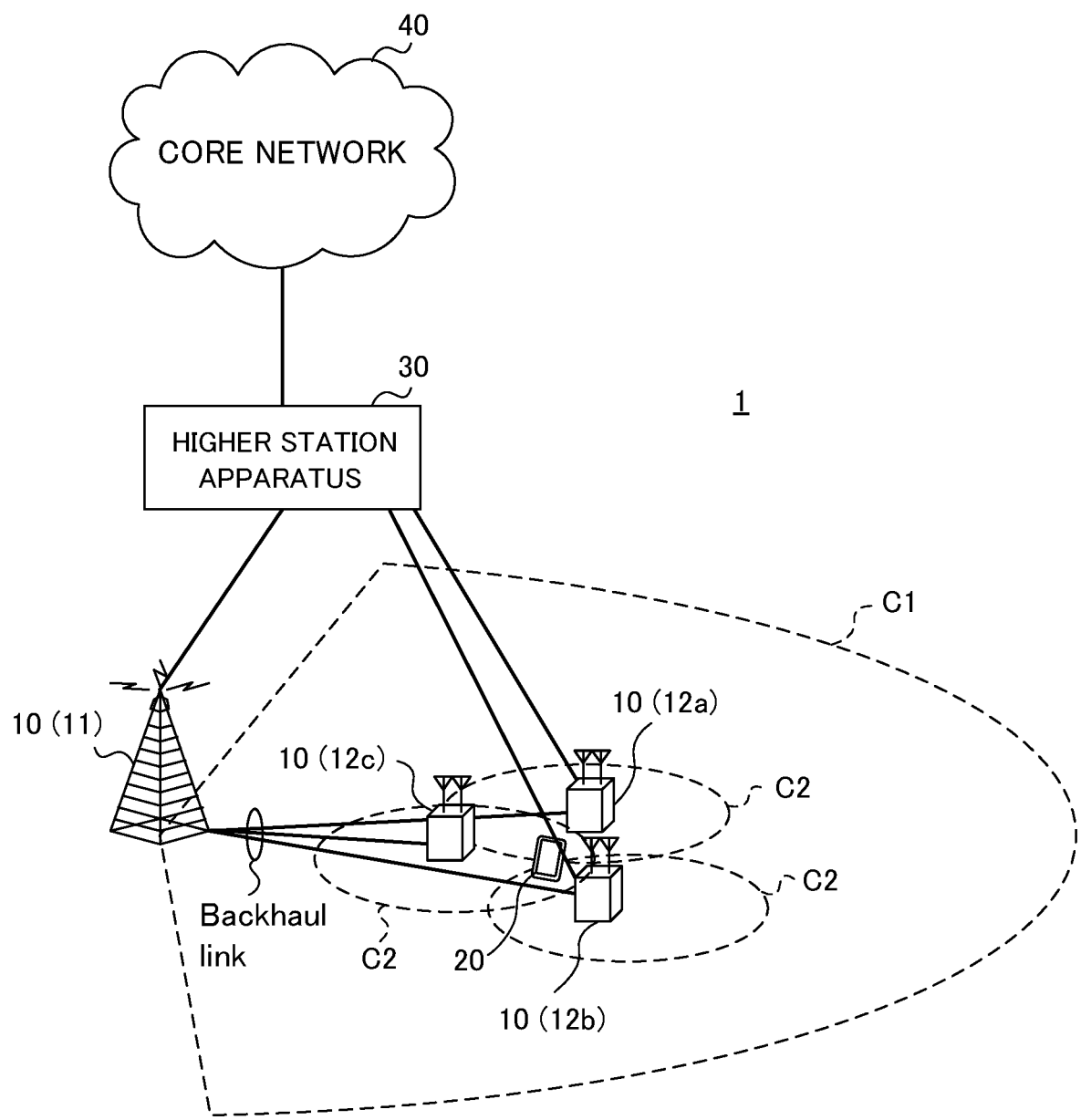
FIG. 10 is a schematic diagram to show an example of a radio communication system in accordance with embodiments of the invention.

FIG. 10 is a diagram to show an example of a schematic structure of a radio communication system according to one or more embodiments of the present invention. Note that the radio communication system shown in FIG. 10 is a system to incorporate, for example, an LTE system, SUPER 3G, an LTE-A system and so on. In this radio communication system, carrier aggregation (CA) and/or dual connectivity (DC) to bundle multiple component carriers (CCs) into one can be used. Also, these multiple CCs include licensed band CCs to use licensed bands and unlicensed band CCs to use unlicensed bands. Note that this radio communication system may be referred to as "IMT-Advanced," or may be referred to as "4G," "5G," "FRA" (Future Radio Access) and so on.

The radio communication system 1 shown in FIG. 10 includes a radio base station 11 that forms a macro cell C1, and radio base stations 12 (12*a* to 12*c*) that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA by using at least two CCs (cells), or use six or more CCs.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Between the radio base station 11 and the radio base stations 12 (or between two radio base stations 12), wire connection (optical fiber, the X2 interface, etc.) or wireless connection may be established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise. The user terminals 20 are terminals to support various communication schemes such as LTE, LTE-A and so on, and may be either mobile communication terminals or stationary communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, MIBs (Master Information Blocks) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH may be frequency-division-multiplexed with the PDSCH (downlink shared data channel) and used to communicate DCI and so on, like the PDCCH.

Also, as downlink reference signals, cell-specific reference signals (CRSs), channel state measurement reference signals (CSI-RSs: Channel State Information-Reference Signals), user-specific reference signals (DM-RSs: Demodulation Reference Signals) for use for demodulation, and other signals are included.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgment signals (HARQ-ACKs) and so on are communicated by the PUCCH. By means of the PRACH, random access preambles (RA preambles) for establishing connections with cells are communicated.

<Radio Base Station>

Figure 11:
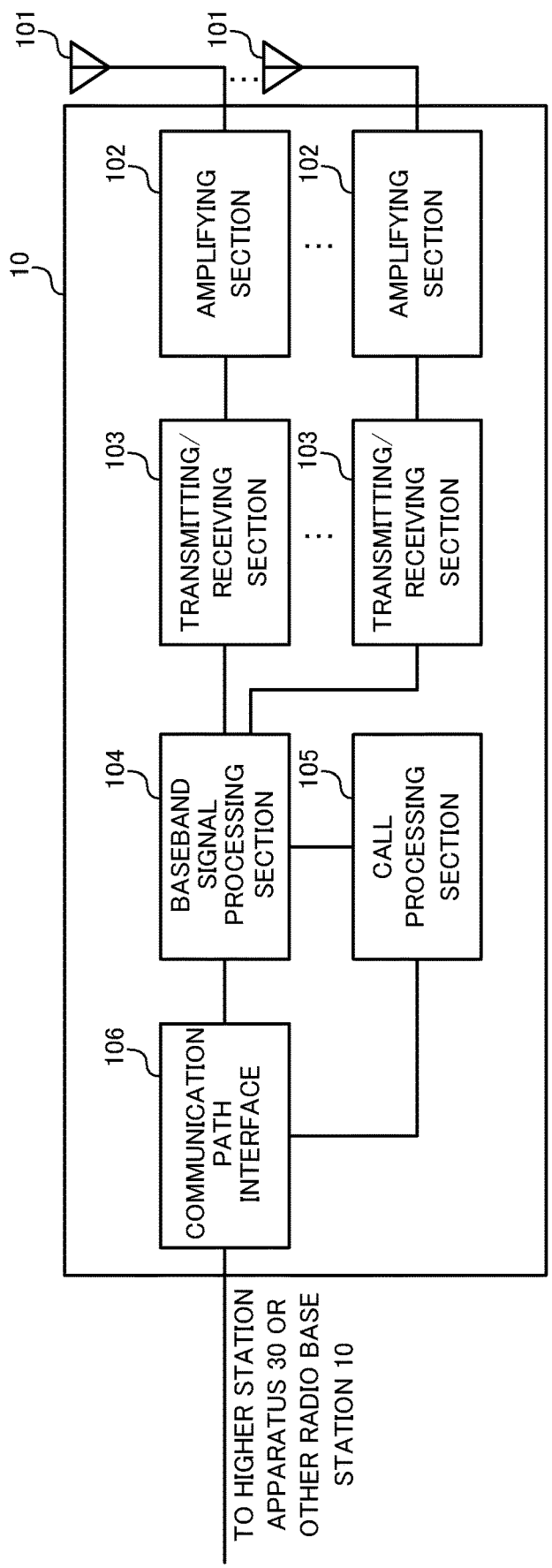
FIG. 11 is a diagram to explain an overall structure of a radio base station in accordance with embodiments of the invention.

FIG. 11 is a diagram to show an example of an overall structure of a radio base station according to embodiments of the present invention. A radio base station 10 has a plurality of transmitting/receiving antennas 10, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

For example, the transmitting/receiving sections (transmitting sections) 103 can transmit DL data (for example, the PUSCH and/or the PDCCH/EPDCCH) and measurement signals (for example, DRSs) to the user terminals based on the result of listening. Also, the transmitting/receiving sections (transmitting sections) 103 can transmit information about the period (frozen window) in which the listening to execute before DL data transmission is limited and/or the period in which DL data transmission is limited, to the user terminals. Furthermore, the transmitting/receiving sections (transmitting sections) 103 can transmit information about DMTC to the user terminals. Note that, for the transmitting/receiving sections 103, transmitters/receivers, transmitting/receiving circuits or transmitting/receiving devices that can be described based on common understanding of the technical field to which the present invention pertains can be used.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. The communication path interface 106 transmits and receives signals to and from neighboring radio base stations 10 (backhaul signaling) via an inter-base station interface (for example, optical fiber, the X2 interface, etc.).

Figure 12:
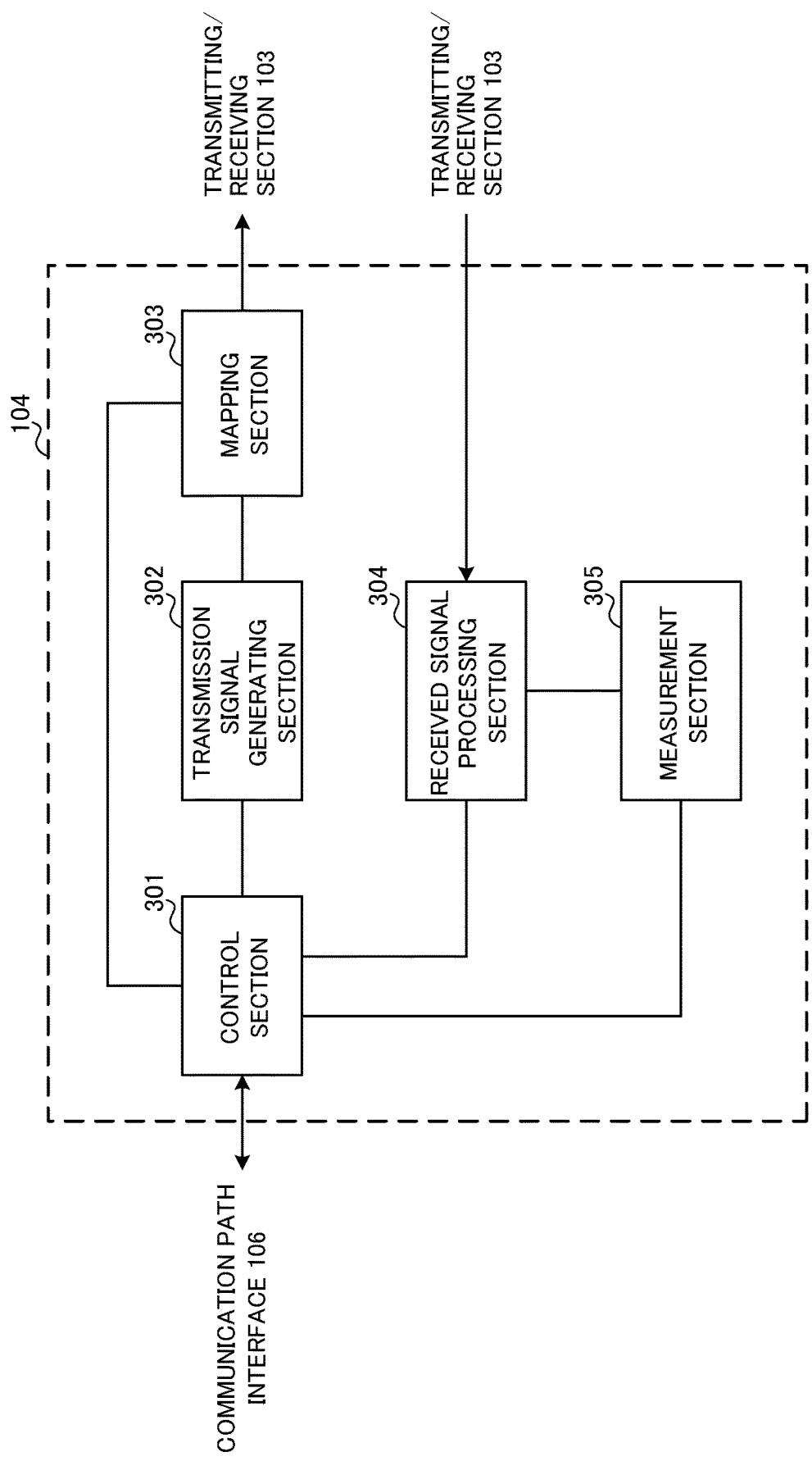
FIG. 12 is a diagram to explain a functional structure of a radio base station in accordance with embodiments of the invention.

FIG. 12 is a diagram to show an example of a functional structure of a radio base station according to one or more embodiments. Note that, although FIG. 12 primarily shows functional blocks that pertain to characteristic parts of the present embodiments, the radio base station 10 has other functional blocks that are necessary for radio communication as well. As shown in FIG. 12, the baseband signal processing section 104 has a control section (scheduler) 301, a transmission signal generating section (generating section) 302, a mapping section 303, a received signal processing section 304 and a measurement section 305.

The control section (scheduler) 301 controls the scheduling (for example, resource allocation, mapping and so on) of downlink data that is transmitted in the PDSCH and downlink control information that is communicated in the PDCCH and/or the EPDCCH. Furthermore, the control section (scheduler) 301 also controls the scheduling (for example, resource allocation, mapping and so on) of system information, synchronization signals, paging information, CRSs, CSI-RSs, discovery signals and so on.

Also, the control section 301 controls the scheduling of uplink data signals that are transmitted in the PUSCH from each user terminal, uplink control signals that are transmitted in the PUCCH and/or the PUSCH, random access preambles that are transmitted in the PRACH, and uplink reference signals.

Furthermore, when the transmission of DL data and DRSs is controlled based on the result of listening that is performed before signal transmission, the control section 301 can apply different conditions between the listening that is performed before DL data is transmitted and the listening that is performed before measurement signals are transmitted (by allowing different listening operations, limiting the transmission period, and so on).

For example, the control section 301 can exert control so that initial CCA and/or CW adjustment are applied to the listening for DL data transmission, but are not applied to the listening for DRS transmission (see FIG. 3). Also, the control section 301 can configure the backoff counter value to 0, on a fixed basis, in the listening for DRS transmission (see FIG. 4).

For example, the control section 301 can control the listening for DRS transmission to be performed within a range of a pre-configured/predetermined period (active window) (see FIG. 5). The predetermined period may be the same period as a candidate DRS transmission period (DMTC), or may be the period that is defined by shifting forward the starting point and/or the end point of the candidate DRS transmission period (DMTC) in time by a predetermined value. Also, the control section 301 can apply the backoff counter value at the end of the listening for measurement signals performed in a range of a predetermined period to the listening for measurement signals that is performed in (at the beginning of) the next range of a predetermined period.

Also, the control section 301 controls the listening for DL data transmission not to be performed in at least one of the period in which DRSs are transmitted, the whole period of a candidate DRS transmission period (DMTC) and a partial period of a candidate DRS transmission period (see FIG. 6). Also, the control section 301 controls DL data not to be transmitted in at least one of the period in which DRSs are transmitted, the whole period of a candidate DRS transmission period (DMTC) and a partial period of a candidate DRS transmission period (see FIGS. 7A-7E and FIGS. 8A-8D).

Note that, for the control section 301, a controller, a control circuit or a control device that can be described based on common understanding of the technical field to which the present invention pertains can be used.

The transmission signal generating section 302 generates DL signals based on commands from the control section 301 and outputs these signals to the mapping section 303. For example, the transmission signal generating section 302 generates DL assignments, which report downlink signal allocation information, and UL grants, which report uplink signal allocation information, based on commands from the control section 301. Note that, for the transmission signal generating section 302, a signal generator, a signal generating circuit or a signal generating device that can be described based on common understanding of the technical field to which the present invention pertains can be used.

The mapping section 303 maps the downlink signals generated in the transmission signal generating section 302 (for example, synchronization signals, cell-specific reference signals, discovery signals including channel state measurement reference signals, and so on) to predetermined radio resources, based on commands from the control section 301, and outputs these to the transmitting/receiving sections 103. Note that, for the mapping section 303, a mapper, a mapping circuit or a mapping device that can be described based on common understanding of the technical field to which the present invention pertains can be used.

The receiving process section 304 performs receiving processes (for example, demapping, demodulation, decoding and so on) of UL signals (for example, delivery acknowledgement signals (HARQ-ACKs), data signals that are transmitted in the PUSCH, and so on) transmitted from the user terminals. The processing results are output to the control section 301. For the received signal processing section 304, a signal processor, a signal processing circuit or a signal processing device that can be described based on common understanding of the technical field to which the present invention pertains can be used.

Also, by using the received signals, the measurement section 305 can measure the received power (for example, RSRP (Reference Signal Received Power)), the received quality (for example, RSRQ (Reference Signal Received Quality)), channel states (CSI) and so on. Also, upon listening before DL signal (DL data, DRS, etc.) transmission in unlicensed bands, the measurement section 305 can measure the received power of signals transmitted from other systems and/or the like. The results of measurements in the measurement section 305 are output to the control section 301.

The control section 301 can control the transmission of DL signals based on measurement results (listening results) in the measurement section 305.

The measurement section 305 can be constituted by a measurer, a measurement circuit or a measurement device that can be described based on common understanding of the technical field to which the present invention pertains.

<User Terminal>

Figure 13:
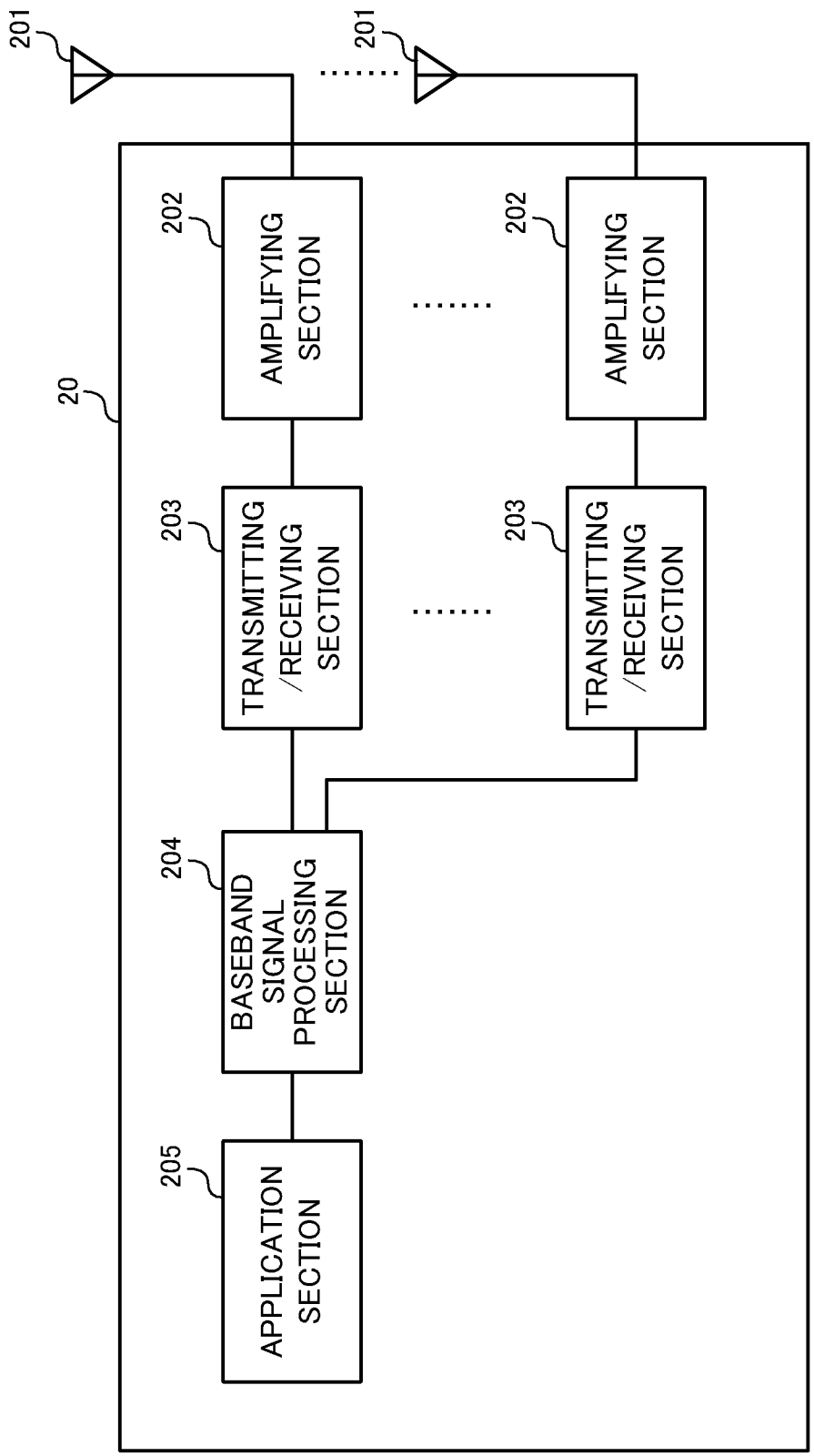
FIG. 13 is a diagram to explain an overall structure of a user terminal in accordance with embodiments of the invention.

FIG. 13 is a diagram to show an example of an overall structure of a user terminal according to one or more embodiments. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and output to the baseband signal processing section 204.

The transmitting/receiving sections (receiving sections) 203 receive DL data and DRSs transmitted from the radio base station based on the result of listening. Also, the transmitting/receiving sections (receiving sections) 203 can receive information about the period (frozen window) in which the listening to execute before DL data transmission is limited and/or the period in which DL data transmission is limited. Note that, for the transmitting/receiving sections 203, transmitters/receivers, transmitting/receiving circuits or transmitting/receiving devices that can be described based on common understanding of the technical field to which the present invention pertains can be used.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 14:
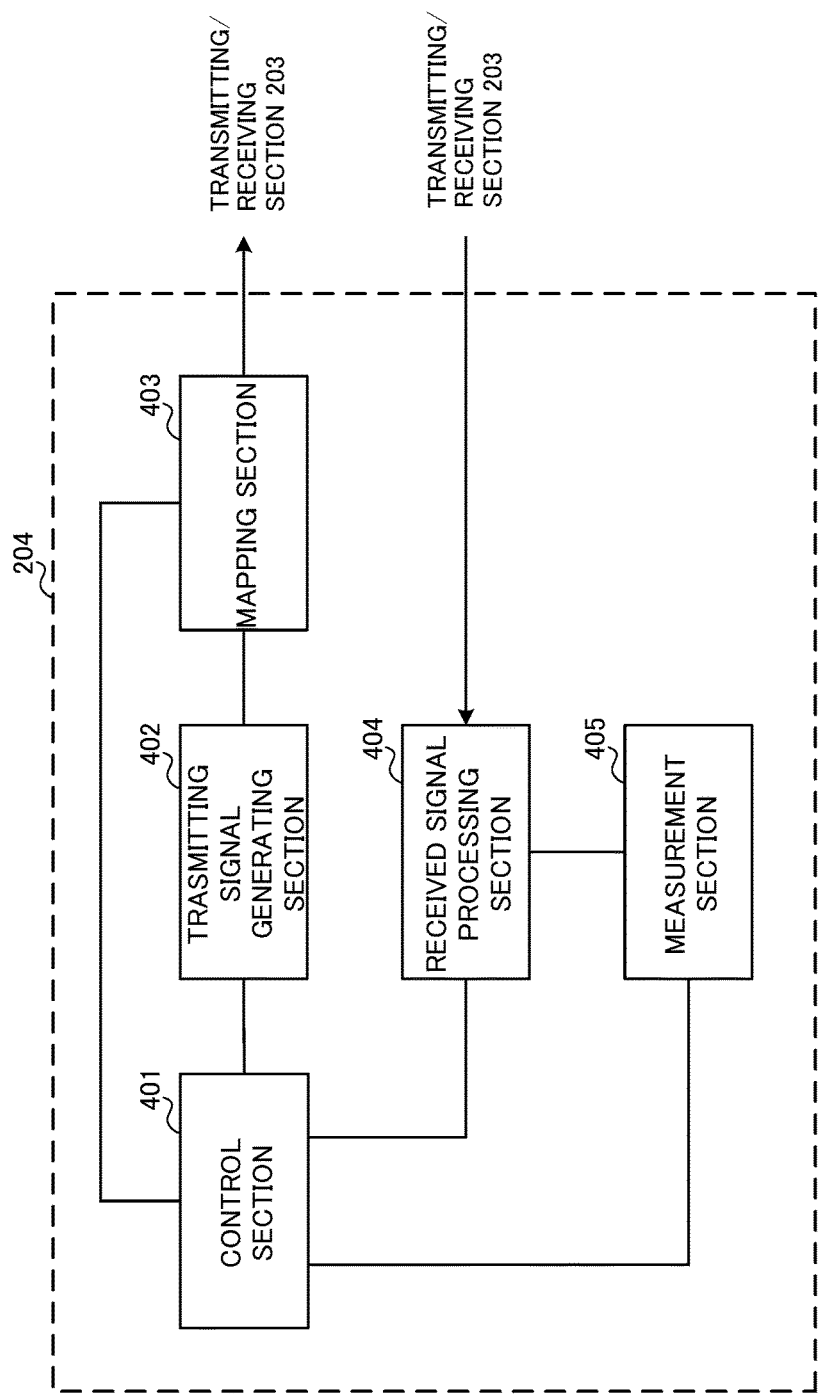
FIG. 14 is a diagram to explain a functional structure of a user terminal in accordance with embodiments of the invention.

FIG. 14 is a diagram to show an example of a functional structure of a user terminal according to one or more embodiments. Note that, although FIG. 14 primarily shows functional blocks that pertain to characteristic parts of the present embodiments, the user terminal 20 has other functional blocks that are necessary for radio communication as well. As shown in FIG. 14, the baseband signal processing section 204 provided in the user terminal 20 has a control section 401, a transmission signal generating section 402, a mapping section 403, a received signal processing section 404 and a measurement section 405.

The control section 401 can control the transmission signal generating section 402, the mapping section 403 and the received signal processing section 404. For example, the control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation/transmission (UL transmission) of uplink control signals (for example, HARQ-ACKs and so on) and uplink data based on downlink control information (UL grants), the result of deciding whether or not retransmission control is necessary for downlink data, and so on. Also, the control section 401 controls the transmission of UL signals based on the result of listening (UL-LBT).

Also, the control section 401 can control DL data receiving processes (for example, the timing of monitoring and so on) based on the information about the period (frozen window) in which the listening to execute before DL data transmission is limited and/or the period in which DL data transmission is limited. Note that, for the control section 401, a controller, a control circuit or a control device that can be described based on common understanding of the technical field to which the present invention pertains can be used.

The transmission signal generating section 402 generates UL signals based on commands from the control section 401, and outputs these signals to the mapping section 403. For example, the transmission signal generating section 402 generates uplink control signals such as delivery acknowledgement signals (HARQ-ACKs) in response to DL signals, channel state information (CSI) and so on, based on commands from the control section 401.

Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal. For the transmission signal generating section 402, a signal generator, a signal generating circuit or a signal generating device that can be described based on common understanding of the technical field to which the present invention pertains can be used.

The mapping section 403 maps the uplink signals (uplink control signals and/or uplink data) generated in the transmission signal generating section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs the receiving processes (for example, demapping, demodulation, decoding and so on) of the DL signals (for example, downlink control signals that are transmitted from the radio base station in the PDCCH/EPDCCH, downlink data signals transmitted in the PDSCH, and so on). The received signal processing section 404 outputs the information received from the radio base station 10, to the control section 401 and the measurement section 405. Note that, for the received signal processing section 404, a signal processor/measurer, a signal processing/measurement circuit or a signal processing/measurement device that can be described based on common understanding of the technical field to which the present invention pertains can be used. Also, the received signal processing section 404 can constitute the receiving section according to embodiments of the present invention.

Also, by using the received signals, the measurement section 305 can measure the received power (for example, RSRP (Reference Signal Received Power)), the received quality (for example, RSRQ (Reference Signal Received Quality)), channel states (CSI) and so on. Furthermore, upon listening that is performed before UL signals are transmitted in unlicensed bands, the measurement section 405 can measure the received power of signals transmitted from other systems and so on. The results of measurements in the measurement section 405 are output to the control section 401. The control section 401 can control the transmission of UL signals based on measurement results (listening results) in the measurement section 405.

The measurement section 405 can be constituted by a measurer, a measurement circuit or a measurement device that can be described based on common understanding of the technical field to which the present invention pertains.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of the radio base station 10 and the user terminal 20 may be implemented by using hardware such as an ASIC (Application-Specific Integrated Circuit), a PLD (Programmable Logic Device), an FPGA (Field Programmable Gate Array) and so on. Also, the radio base stations 10 and user terminals 20 may be implemented with a computer device that includes a processor (CPU), a communication interface for connecting with networks, a memory and a computer-readable storage medium that holds programs. That is, the radio base stations and user terminals according to embodiments of the present invention may function as computers that execute the processes of the radio communication method of the present invention.

Here, the processor and the memory are connected with a bus for communicating information. Also, the computer-readable recording medium is a storage medium such as, for example, a flexible disk, an opto-magnetic disk, a ROM (Read Only Memory), an EPROM (Erasable Programmable ROM), a CD-ROM (Compact Disc-ROM), a RAM (Random Access Memory), a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are performed on the processor, or may be implemented with combinations of both. The processor controls the whole of the user terminals by running an operating system. Also, the processor reads programs, software modules and data from the storage medium into the memory, and executes various types of processes.

Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Also, software and commands may be transmitted and received via communication media. For example, when software is transmitted from a website, a server or other remote sources by using wired technologies such as coaxial cables, optical fiber cables, twisted-pair cables and digital subscriber lines (DSL) and/or wireless technologies such as infrared radiation, radio and microwaves, these wired technologies and/or wireless technologies are also included in the definition of communication media.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "carrier frequencies," "cells" and so on.

Also, the information and parameters described in this description may be represented in absolute values or in relative values with respect to a predetermined value, or may be represented in other information formats. For example, radio resources may be specified by indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

The examples/embodiments illustrated in this description may be used individually or in combinations, and the mode of may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the example s/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, MAC (Medium Access Control) signaling, and broadcast information (MIBs (Master Information Blocks) and SIBs (System Information Blocks))), other signals or combinations of these. Also, RRC signaling may be referred to as "RRC messages," and can be, for example, an RRC connection setup message, RRC connection reconfiguration message, and so on.

The examples/embodiments illustrated in this description may be applied to LTE (Long Term Evolution), LTE-A (LTE-Advanced), SUPER 3G, IMT-Advanced, 4G, 5G, FRA (Future Radio Access), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A radio base station comprising:
 a transmitter that transmits downlink (DL) data on a Physical Downlink Shared Channel (PDSCH) and a measurement signal to a user terminal; and
 a processor that executes control of transmission of the DL data and the measurement signal based on a result of listening, which is performed before signals are transmitted,
 wherein the processor applies a first condition to listening that is performed before the DL data is transmitted and a second condition to listening that is performed before the measurement signal is transmitted,
 wherein the first condition comprises a first duration and a first counter value,
 wherein the second condition comprises at least a second duration out of the second duration and a second counter value,
 wherein the processor controls the transmission of the DL data based on results of initial sensing and sensing based on a Contention Window (CW), and controls the transmission of the measurement signal based on a result of sensing in a predetermined period where a period for the sensing based on the CW is not configured, and
 wherein the processor applies at least one of the initial sensing and a CW adjustment operation to the listening performed before the DL data is transmitted, and does not apply the adjustment operation to the listening performed before the measurement signal is transmitted.

2. The radio base station according to claim 1, wherein the processor executes control of the listening to be performed before the measurement signal is transmitted to be performed in a range of a predetermined period, which is configured in advance.

3. The radio base station according to claim 2, wherein the transmitter makes a transmission period of the measurement signal, which is transmitted based on the result of listening, less than one subframe.

4. The radio base station according to claim 2, wherein the processor controls the DL data not to be transmitted in at least one of: a period in which the measurement signal is transmitted, a whole period in a candidate transmission period for the measurement signal, and a partial period in the candidate transmission period for the measurement signal.

5. The radio base station according to claim 1, wherein the transmitter makes a transmission period of the measurement signal, which is transmitted based on the result of listening, less than one subframe.

6. The radio base station according to claim 5, wherein the processor executes control of the DL data to not be transmitted in at least one of: a period in which the measurement signal is transmitted, a whole period in a candidate transmission period for the measurement signal, and a partial period in the candidate transmission period for the measurement signal.

7. The radio base station according to claim 1, wherein the processor controls the DL data to not be transmitted in at least one of: a period in which the measurement signal is transmitted, a whole period in a candidate transmission period for the measurement signal, and a partial period in the candidate transmission period for the measurement signal.

8. The radio base station according to claim 1, wherein the measurement signal is a discovery signal.

9. A user terminal comprising:
 a receiver that receives downlink (DL) data on a Physical Downlink Shared Channel (PDSCH) and a measurement signal that are transmitted from a radio base station based on results of listening; and
 a processor that executes control of receipt of the DL data and the measurement signal,
 wherein a first condition is applied to listening that is performed before the DL data is transmitted and a second condition is applied to listening that is performed before the measurement signal is transmitted,
 wherein the first condition comprises a first duration and a first counter value,
 wherein the second condition comprises at least a second duration out of the second duration and a second counter value,
 wherein the radio base station controls transmission of the DL data based on results of initial sensing and sensing based on a Contention Window (CW), and controls transmission of the measurement signal based on a result of sensing in a predetermined period where a period for the sensing based on the CW is not configured, and
 wherein the radio base station applies at least one of the initial sensing and a CW adjustment operation to the listening performed before the DL data is transmitted, and does not apply the adjustment operation to the listening performed before the measurement signal is transmitted.

10. A radio communication method comprising the steps of:
 executing listening before transmitting DL data on a Physical Downlink Shared Channel (PDSCH) and before transmitting a measurement signal; and
 transmitting the DL data and the measurement signal based on listening results,
 wherein a first condition is applied to the listening that is performed before the DL data is transmitted and a second condition is applied to the listening that is performed before the measurement signal is transmitted,
 wherein the first condition comprises a first duration and a first counter value,
 wherein the second condition comprises at least a second duration out of the second duration and a second counter value,
 wherein the method further comprises controlling the transmitting of the DL data based on results of initial sensing and sensing based on a Contention Window (CW), and controlling the transmission of the measurement signal based on a result of sensing in a predetermined period where a period for the sensing based on the CW is not configured, and wherein the method further comprises applying at least one of the initial sensing and a CW adjustment operation to the listening performed before the DL data is transmitted, and not applying the adjustment operation to the listening performed before the measurement signal is transmitted.

\* \* \* \* \*